(12) United States Patent
Suga

(10) Patent No.: US 10,194,389 B2
(45) Date of Patent: Jan. 29, 2019

(54) DATA PROCESSING DEVICE, DATA PROCESSING METHOD, AND PROGRAM FOR SAMPLING RATE CONTROL OF SENSORS

(71) Applicant: SONY CORPORATION, Tokyo (JP)

(72) Inventor: Yoshitaka Suga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 190 days.

(21) Appl. No.: 14/436,945

(22) PCT Filed: Nov. 20, 2013

(86) PCT No.: PCT/JP2013/006825
§ 371 (c)(1),
(2) Date: Apr. 20, 2015

(87) PCT Pub. No.: WO2014/083806
PCT Pub. Date: Jun. 5, 2014

(65) Prior Publication Data
US 2015/0282075 A1 Oct. 1, 2015

(30) Foreign Application Priority Data
Nov. 29, 2012 (JP) .................... 2012-260627

(51) Int. Cl.
*H04W 52/02* (2009.01)
*G06F 9/50* (2006.01)
(Continued)

(52) U.S. Cl.
CPC ...... *H04W 52/0209* (2013.01); *G06F 9/5061* (2013.01); *H04W 4/70* (2018.02);
(Continued)

(58) Field of Classification Search
CPC .. H04W 52/0209; H04W 4/005; G06F 9/5061
See application file for complete search history.

(56) References Cited

U.S. PATENT DOCUMENTS 5,835,160 A * 11/1998 Chen .................... G06T 3/4023
348/581
2008/0248789 A1 10/2008 Song et al.
(Continued)

FOREIGN PATENT DOCUMENTS

JP 2000-209225 A 7/2000
JP 4673250 B2 4/2011
(Continued)

OTHER PUBLICATIONS

International Search Report dated Feb. 12, 2014 in PCT/JP2013/006825.
(Continued)

*Primary Examiner* — Ricky Q Ngo
*Assistant Examiner* — Stephen N Steiner
(74) *Attorney, Agent, or Firm* — Xsensus, LLP

(57) ABSTRACT

There is provided a data processing apparatus including a first processor configured to acquire sensor data from at least one sensor, wherein the first processor provides the acquired sensor data and a cycle information to a second processor, and wherein the cycle information includes information indicating a sampling cycle corresponding to a timing at which the sensor data is acquired.

22 Claims, 15 Drawing Sheets

(51) Int. Cl.
*H04W 4/70* (2018.01)
*H04W 84/18* (2009.01)

(52) U.S. Cl.
CPC ............ *H04W 84/18* (2013.01); *Y02D 10/22* (2018.01); *Y02D 10/36* (2018.01); *Y02D 70/00* (2018.01); *Y02D 70/164* (2018.01)

(56) References Cited

U.S. PATENT DOCUMENTS

| | | | | | |
|---|---|---|---|---|---|
| 2011/0273309 | A1* | 11/2011 | Zhang | ............... | H04M 1/72536 340/870.07 |
| 2012/0254878 | A1* | 10/2012 | Nachman | ............... | G06F 9/5094 718/102 |
| 2013/0150027 | A1* | 6/2013 | Leclercq | ............... | H04W 4/021 455/427 |

FOREIGN PATENT DOCUMENTS

| | | |
|---|---|---|
| JP | 2011-135141 A | 7/2011 |
| JP | 2011-158990 A | 8/2011 |

OTHER PUBLICATIONS

Office Action dated Apr. 19, 2016 in Japanese Application No. 2012-260627.
Combined Office Action and Search Report dated Jan. 11, 2017 in Chinese Patent Application No. 201380061027.5 (with English translation).
Office Action issued in Chinese Application No. 201380061027.5 dated Sep. 11, 2017 (with English translation).
Chinese Office Action dated Mar. 22, 2018 for Chinese Application No. 201380061027.5, and English translation thereof.

* cited by examiner

FIG. 11

| SAMPLING CYCLE | Index | REQUEST FLAG | INITIAL VALUE (FIXED VALUE) | REMAINING COUNT VALUE |
|---|---|---|---|---|
| 1T | "100000" | off | 1 | 1 |
| 2T | "010000" | off | 2 | 2 |
| 3T | "001000" | on | 3 | 1 |
| 4T | "000100" | on | 4 | 2 |
| 5T | "000010" | on | 5 | 3 |
| 6T | "000001" | off | 6 | 5 |

MANAGEMENT TABLE USED TO MANAGE PROVISION OF SENSOR DATA

DATA PROCESSING DEVICE, DATA PROCESSING METHOD, AND PROGRAM FOR SAMPLING RATE CONTROL OF SENSORS

TECHNICAL FIELD

The present technology relates to a data processing device, a data processing method, and a program, and particularly to a data processing device, a data processing method, and a program that can lower loads and achieve low power consumption.

BACKGROUND ART

In recent years, sensor technologies represented by MEMS (Micro-Electro-Mechanical Systems) have evolved, and miniaturization and lowering of cost of sensors that can sense various kinds of physical quantities have progressed. Along with the miniaturization and lowering of cost of such sensors, a number of sensors used in various applications have been mounted in mobiles terminals, for example, digital cameras, smartphones, and the like.

In digital cameras, for example, a gyro sensor is mounted, and using the gyro sensor, camera-shake during photographing is corrected. Furthermore, in digital cameras in recent years, a geomagnetic sensor and an acceleration sensor have been mounted, and accordingly, positions and postures of the digital cameras, an orientation of photographing, and the like are recorded as metadata of photos (images) photographed using the digital cameras.

In addition, in smartphones, for example, various sensors are used in games that diversely react to behaviors of the smartphones and other applications.

Here, as sensors mounted in mobile terminals, for example, there are pneumatic sensors, illuminance sensors, proximity sensors, and the like, in addition to the sensors described above.

Note that PTL 1 has proposed a sensor data collecting method for reducing a load of a program that collects sensor data indicating physical quantities output after a sensor senses the physical quantities.

CITATION LIST

Patent Literature

PTL 1: Specification of Japanese Patent No. 4673250

SUMMARY OF INVENTION

Technical Problem

A mobile terminal has a Central Processing Unit (CPU) that executes programs and performs various processes, sensors mounted in the mobile terminal are connected to the CPU, and the CPU acquires sensor data from the sensors, and thus frequently communicates with the sensors.

Since the sensors do not have high-speed communication means, it is necessary for the CPU to access the sensors at a low speed plural times in order to acquire desired sensor data from the sensors, and thus the CPU spends a relatively long time in acquiring the sensor data.

In recent years, high-performance CPUs have been developed in order to deal with image processing, audio processing, communication processing, and the like that impose relatively heavy loads on mobile terminals, and it is hard to say that such a high-performance CPU is efficient when it spends a long period of time in a simple process of acquiring sensor data.

In addition, since the high-performance CPU consumes a great amount of power, a lot of power is consumed to acquire sensor data, and as a result, the standby time of a battery of a mobile terminal is shortened.

Furthermore, when the CPU performs a process that has to be done in real-time, for example, frequent interrupts of the process of acquiring sensor data impose a heavy load on the CPU, and thereby the overall performance of the mobile terminal deteriorates.

It is desirable to enable a reduced load for acquiring sensor data and low power consumption.

Solution to Problem

According to an embodiment of the present technology, there is provided a data processing apparatus including a first processor configured to acquire sensor data from at least one sensor, wherein the first processor provides the acquired sensor data and a cycle information to a second processor, and wherein the cycle information includes information indicating a sampling cycle corresponding to a timing at which the sensor data is acquired.

According to another embodiment of the present technology, there is provided a data processing apparatus including a second processor configured to execute an application program, wherein the executed application program requests a sensor data acquired by a first processor that is coupled to the second processor, and the second processor receives the requested sensor data and a cycle information from the first processor in response to the request, wherein the cycle information includes information indicating a sampling cycle corresponding to a timing at which the sensor data is acquired.

According to another embodiment of the present technology, there is provided a data processing method including executing an application program by a second processor, wherein the executed application program requests a sensor data acquired by a first processor that is coupled to the second processor, and the second processor receives the requested sensor data and a cycle information from the first processor in response to the request, and wherein the cycle information includes information indicating a sampling cycle corresponding to a timing at which the sensor data is acquired.

According to another embodiment of the present technology, there is provided a non-transitory computer-readable medium having embodied thereon a program, which when executed by a computer causes the computer to execute a method, the method including executing an application program by a second processor, wherein the executed application program requests a sensor data acquired by a first processor that is coupled to the second processor, and the second processor receives the requested sensor data and a cycle information from the first processor in response to the request, and wherein the cycle information includes information indicating a sampling cycle corresponding to a timing at which the sensor data is acquired.

According to another embodiment of the present technology, there is provided a data processing method including acquiring, by a first processor, sensor data from at least one sensor, wherein the acquired sensor data and a cycle information are provided to a second processor by the first processor, and wherein the cycle information includes information indicating a sampling cycle corresponding to a timing at which the sensor data is acquired.

According to another embodiment of the present technology, there is provided a non-transitory computer-readable medium having embodied thereon a program, which when executed by a computer causes the computer to execute a method, the method including acquiring, by a first processor, sensor data from at least one sensor, wherein the acquired sensor data and a cycle information are provided to a second processor by the first processor, and wherein the cycle information includes information indicating a sampling cycle corresponding to a timing at which the sensor data is acquired.

According to still another embodiment of the present technology, the acquired sensor data may be provided to an application program executed by the second processor, at a timing based on the cycle information.

Advantageous Effects of Invention

According to embodiments of the present technology, it is possible to reduce a load and achieve low power consumption.

BRIEF DESCRIPTION OF DRAWINGS

FIG. 11 is a diagram illustrating a management table.

DESCRIPTION OF EMBODIMENTS

<Mobile Terminal of which a Main CPU Acquires Sensor Data>

Figure 1:
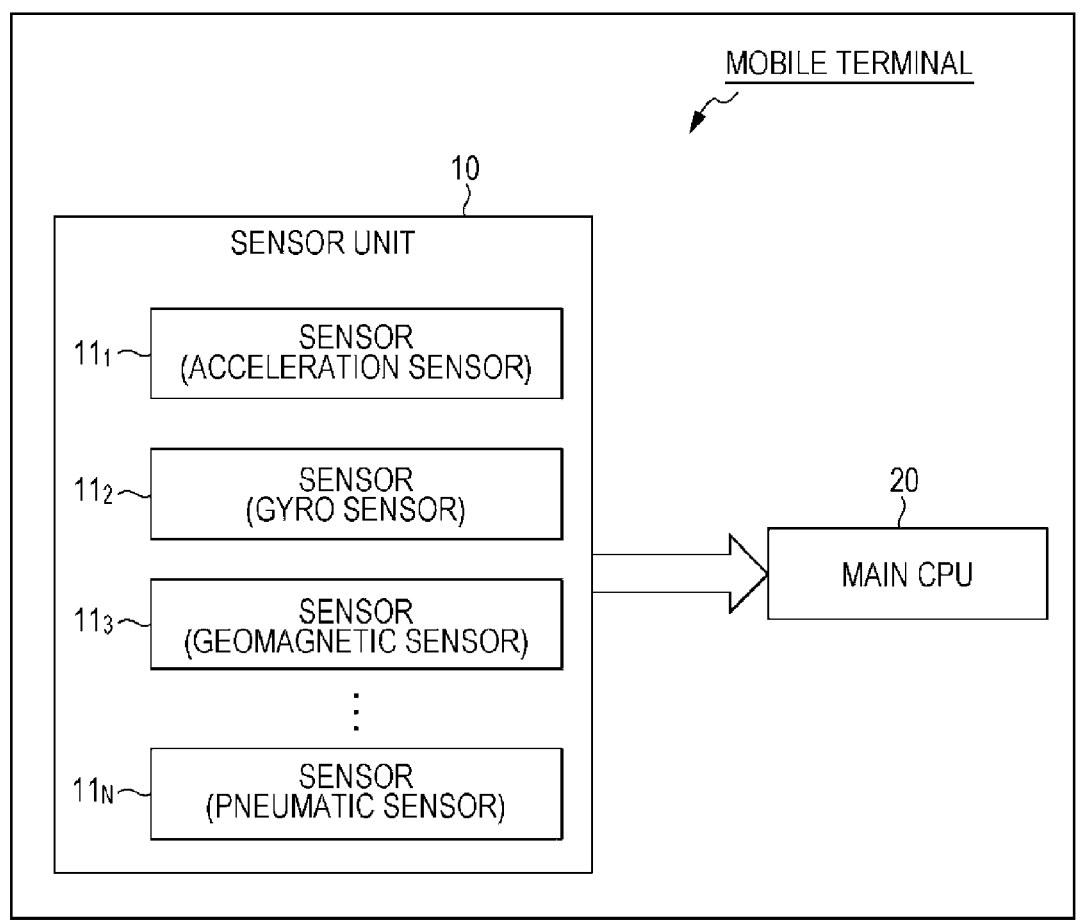
FIG. 1 is a block diagram illustrating a configuration example of a mobile terminal of which a main CPU acquires sensor data.

FIG. 1 is a block diagram illustrating a configuration example of a mobile terminal having a main CPU acquiring sensor data.

In FIG. 1, the mobile terminal has a sensor unit 10 and a main CPU 20.

The sensor unit 10 has N sensors from sensor $11_1$ to $11_N$ where N is 1 or a higher number. A sensor $11_n$ (n=1, 2, ..., N) senses a predetermined physical quantity and outputs sensor data indicating the physical quantity.

Here, in FIG. 1, an acceleration sensor is employed as the sensor $11_1$, a gyro sensor as the sensor $11_2$, and a geomagnetic sensor as the sensor $11_3$. In addition, as the sensor $11_N$, a pneumatic sensor is employed.

The main CPU 20 is a high-performance CPU with a high processing speed in comparison to a sub CPU to be described later, executes an OS (Operating System), and further executes games and other various applications.

In addition, in FIG. 1, the main CPU 20 is (directly) connected to the sensor unit 10, acquires sensor data from a necessary sensor $11_n$, and provides the data to applications that use the data.

Here, there are various applications that the main CPU 20 executes. In other words, as an application executed by the main CPU 20, for example, there is an application (hereinafter, referred to as a first application) that detects a posture of a mobile terminal and switches display of the screen to be horizontal or vertical (display in which the right-left direction of an image coincides with the longitudinal direction or the direction orthogonal to the longitudinal direction of the screen) depending on whether the state of (the longitudinal direction of) the screen is set horizontally or vertically.

In addition, as another application executed by the main CPU 20, for example, there is an electronic compass application (hereinafter, referred to as a second application) that measures in which direction the mobile terminal possessed by a user is oriented in order to cause directions of a map displayed on a screen of the mobile terminal to coincide with the actual directions.

Furthermore, as still another application executed by the main CPU 20, for example, there is a pedometer application (hereinafter, referred to as a third application) that measures the number of steps of a user who possesses the mobile terminal.

All of the first to third applications use sensor data output by, for example, the sensor $11_1$ serving as the acceleration sensor. For this reason, the first to third applications make a request to the main CPU 20 for the sensor data output by the sensor $11_1$ serving as the acceleration sensor.

When executing the first to third applications, the main CPU 20 acquires the sensor data from the sensor $11_1$ according to the request from the first to third applications, and provides (supplies) the data to each of the first to third applications.

Here, the first application that switches between horizontal and vertical display of the screen uses the sensor data of the sensor $11_1$ serving as the acceleration sensor in a cycle (frequency) of about, for example, 5 Hz. In addition, the second application of the electronic compass uses the sensor data of the sensor $11_1$ in a cycle of, for example, about 10 Hz, and the third application of the pedometer uses the sensor data of the sensor $11_1$ in a cycle of, for example, about 20 Hz.

As described above, there are cases in which cycles of sensor data used for applications (hereinafter, referred to as sampling cycles) differ.

It should be noted that, hereinafter, it is assumed that sensor data is acquired from one sensor $11_n$ out of the sensors $11_1$ to $11_N$ in order to simplify description.

Figure 2:
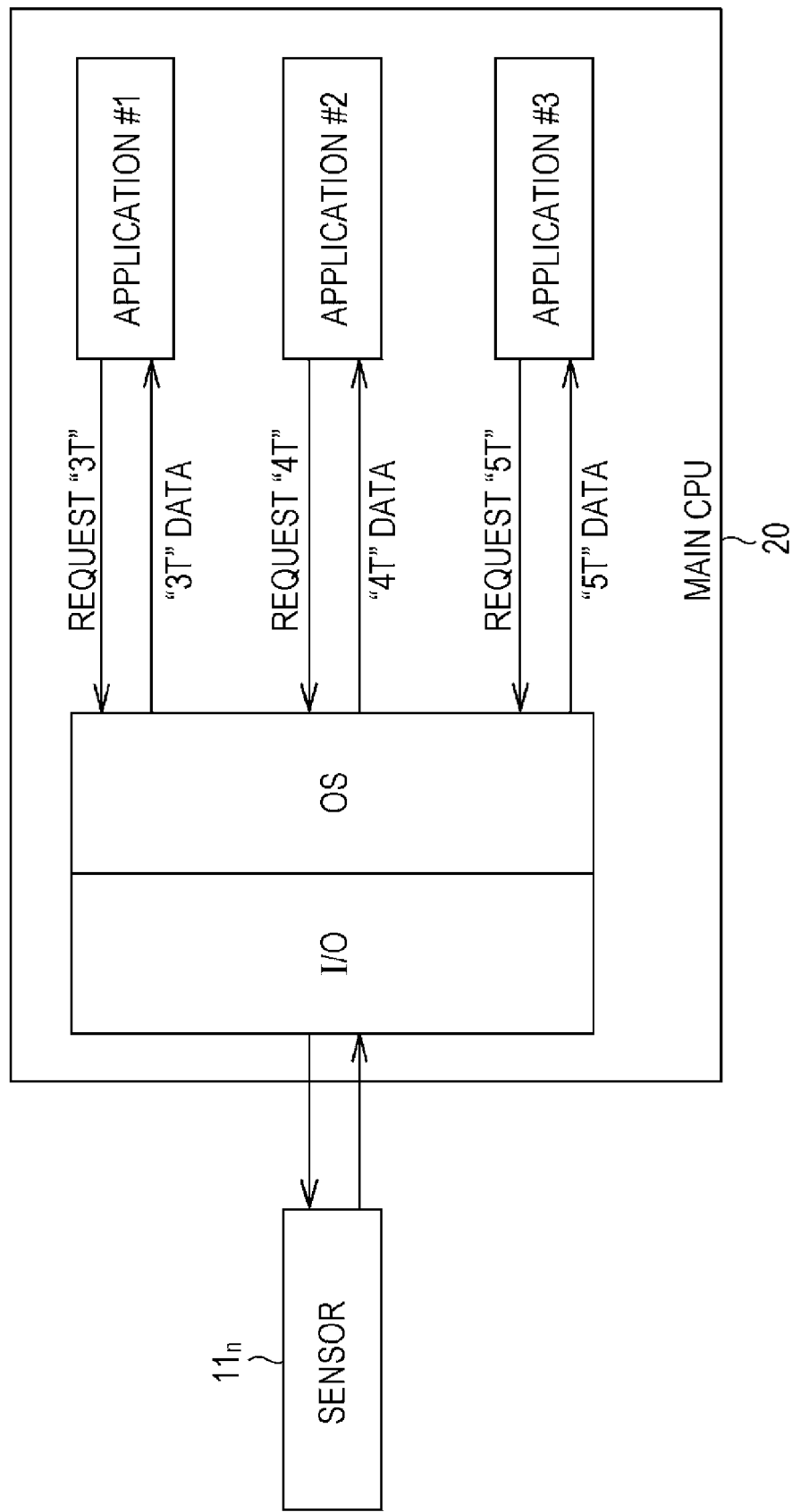
FIG. 2 is a diagram describing a process of the mobile terminal in which the main CPU 20 acquires sensor data from a sensor and provides applications with the data.

FIG. 2 is a diagram describing a process of the mobile terminal of FIG. 1 in which the main CPU 20 acquires sensor data from the sensor $11_n$ and provides the applications with the data.

In FIG. 2, in the main CPU 20, a device driver for exchanging data with external devices, an I/O (Input/Output) which is a utility (program) for managing inputs and outputs, and an OS which manages resources and performs various kinds of control are operated (executed).

Furthermore, in the main CPU 20 of FIG. 2, three applications #1, #2, and #3 as one or more applications are executed (operated) under the management of the OS.

Here, a sampling cycle serving as a reference (hereinafter, referred to as a reference cycle) is set to be indicated by T, and a sampling cycle of sensor data used for the applications is set to be indicated by an integral multiple of the reference cycle.

It should be noted that, as the reference cycle, for example, a cycle of an operation clock of the sensor $11_n$ or the main CPU 20, an integral multiple of this cycle, or the like can be employed.

In FIG. 2, the applications #1 to #3 use sensor data each having sampling cycles of 3T, 4T, and 5T, and make a request to the OS for the sensor data having the sampling cycles.

The OS acquires the sensor data from the sensor $11_n$ at the timings of the sampling cycles of 3T, 4T, and 5T according to the requests from the applications #1 to #3, and provides the applications #1 to #3 with the sensor data of the sampling cycles of 3T, 4T, and 5T.

Hereinafter, sensor data having a sampling cycle of k×T (k is a positive integer) is also referred to as k×T data.

When jitter occurs in sensor data provided to an application #i and intervals (sampling cycles) of the sensor data are uneven, a disorder occurs in waveform processing such as filtering of the sensor data performed by the application #i using a low-pass filter.

For this reason, the OS acquires the sensor data from the sensor $11_n$ and provides the application #i with the data at timings of the sampling cycles that the application #i requests.

In FIG. 2, since the OS receives requests for the sensor data having the sampling cycles of 3T, 4T, and 5T from the applications #1 to #3, the OS acquires the sensor data from the sensor $11_n$ at a timing of 3T (times with an interval of 3T), a timing of 4T, and a timing of 5T.

In addition, the OS provides the sensor data acquired from the sensor $11_n$ at the timing of 3T to the application #1, and provides sensor data acquired from the sensor $11_n$ at the timing of 4T to the application #2. In addition, the OS provides the sensor data acquired from the sensor $11_n$ at the timing of 5T to the application #3.

As shown in FIG. 1 and FIG. 2, when the main CPU 20 acquires the sensor data from the sensor $11_n$, the timings at which the sensor data is acquired from the sensor $11_n$ are managed by the main CPU 20.

Thus, the main CPU 20 recognizes to what timing of sampling cycle a timing at which the sensor data is acquired from the sensor $11_n$ corresponds, and therefore, the sensor data acquired from the sensor $11_n$ at a predetermined timing of sampling cycle can be provided to the application that has requested the sensor data having the sampling cycle.

However, since the main CPU 20 executes various applications, a high-performance CPU is employed for the main CPU 20 as described above. In addition, since the main CPU 20 having such high performance acquires sensor data as shown in FIG. 1 and FIG. 2, an increasing load is imposed on the main CPU 20, and as a result, power consumption of the entire mobile terminal soars.

<Mobile Terminal of which a Sub CPU Acquires Sensor Data>

Figure 3:
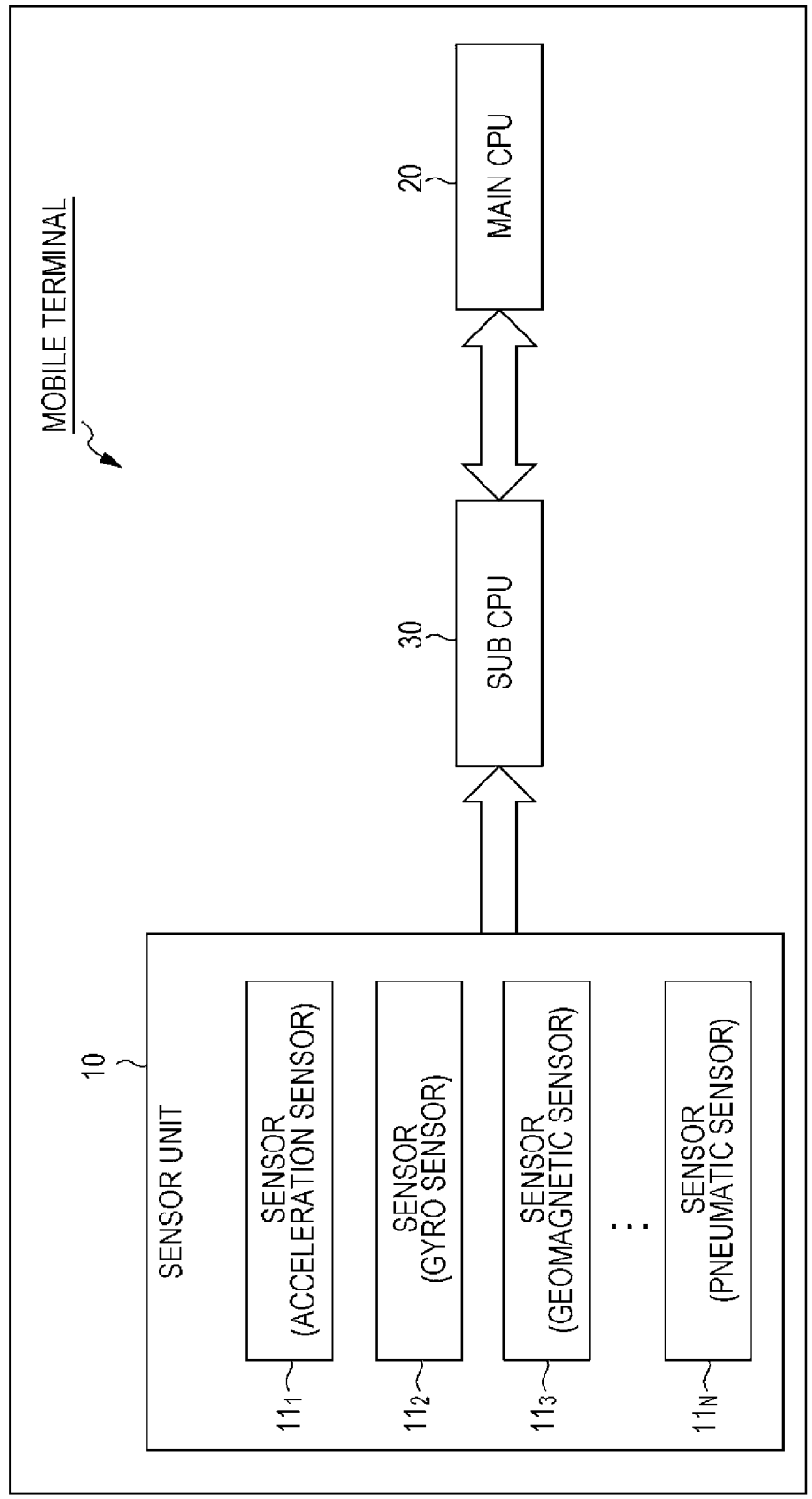
FIG. 3 is a block diagram illustrating another configuration example of the mobile terminal of which a sub CPU acquires sensor data.

FIG. 3 is a block diagram illustrating another configuration example of the mobile terminal of which a sub CPU acquires sensor data.

It should be noted that, in the drawing, the same reference numerals are given to constituent elements corresponding to those of FIG. 1, and description thereof will be appropriately omitted hereinbelow.

The mobile terminal of FIG. 3 is the same as in FIG. 1 in that it has the sensor unit 10 and the main CPU 20. The mobile terminal of FIG. 3 is, however, different from that of FIG. 1 in that a sub CPU 30 is newly provided therein.

In FIG. 3, the sub CPU 30 is provided between the sensor unit 10 and the main CPU 20. In addition, the sensor unit 10 is (directly) connected to the sub CPU 30, and thus, the main CPU 20 is not (directly) connected to the sensor unit 10.

Although the sub CPU 30 exhibits performance such as a processing speed inferior to (lesser than) the main CPU 20 that executes various applications, it is a CPU consuming little power and taking charge of acquisition of sensor data.

In other words, in FIG. 3, the sub CPU 30 acquires sensor data from the necessary sensor $11_n$ according to a request from (an application executed by) the main CPU 20, and the main CPU 20 then provides the sensor data to a requesting application.

Thus, in FIG. 3, since the main CPU 20 may not perform a process of acquiring the sensor data from the sensor $11_n$, a load imposed on the main CPU 20 can be further reduced than in the cases of FIG. 1 and FIG. 2. Furthermore, since the acquisition of the sensor data is performed not by the main CPU 20 that consumes much power but by the sub CPU 30 that consumes little power, low power consumption of the entire mobile terminal can be achieved.

Figure 4:
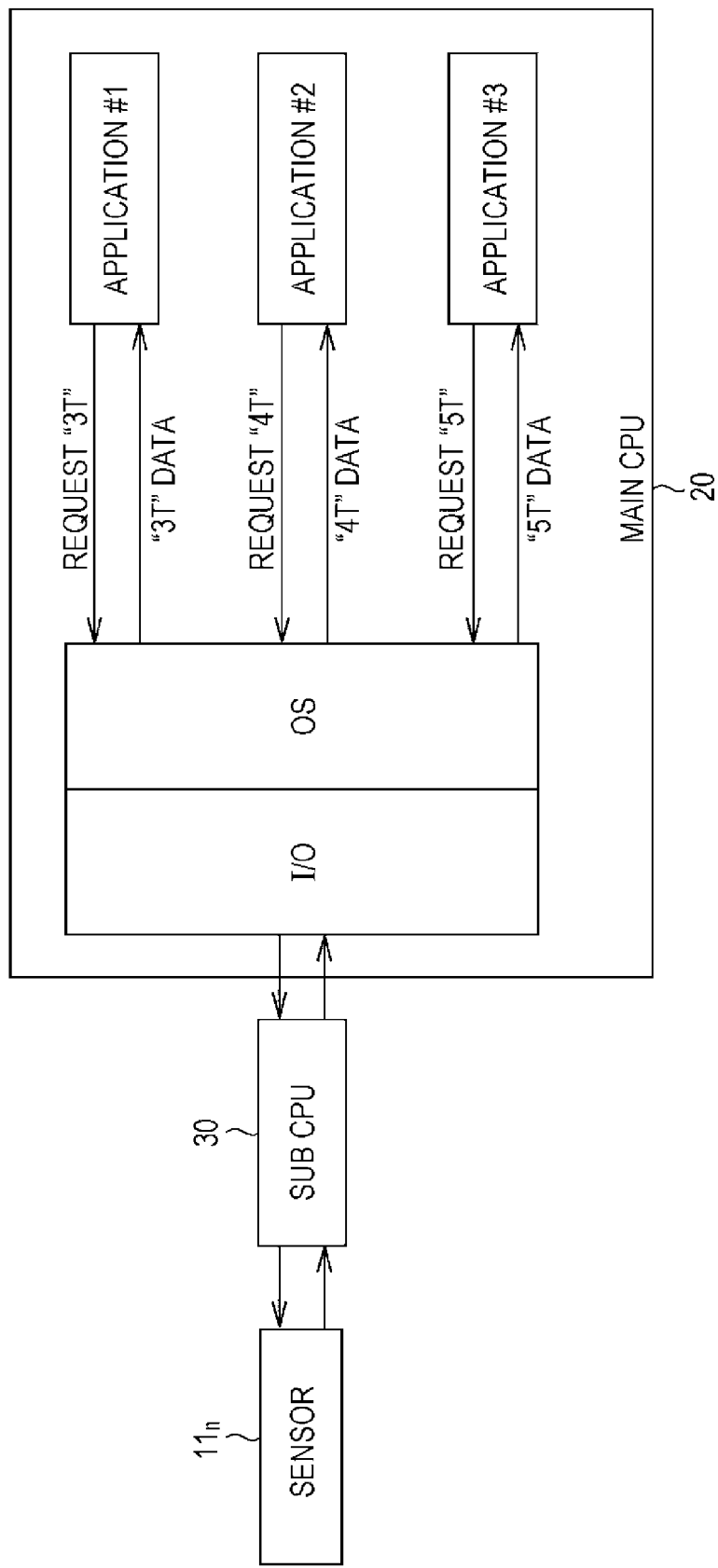
FIG. 4 is a diagram describing a process of the mobile terminal in which the sub CPU 30 acquires sensor data from a sensor and provides the applications with the data via the main CPU 20.

FIG. 4 is a diagram describing a process of the mobile terminal of FIG. 3 in which the sub CPU 30 acquires sensor data from the sensor $11_n$ and provides the applications with the data via the main CPU 20.

In the main CPU 20, the I/O and the OS are operated as in the case of FIG. 2, and further, the three applications #1 to #3 are executed under the management of the OS.

In the same manner as in the case of FIG. 2, the applications #1 to #3 use sensor data having sampling cycles of 3T, 4T, and 5T, and make a request to the OS for the sensor data having the sampling cycles.

The OS makes the same request to the sub CPU 30 via the I/O according to the requests for the sensor data from each of the applications #1 to #3.

The sub CPU 30 acquires the sensor data from the sensor $11_n$ at the timings of the sampling cycles of 3T, 4T, and 5T according to the request for the sensor data from the OS, in other words, the requests for the sensor data from each of the applications #1 to #3, and provides the sensor data of the sampling cycles of 3T, 4T, and 5T to each of the applications #1 to #3 via the OS (and the I/O) of the main CPU 20.

In FIG. 3 and FIG. 4, the sensor data is acquired from the sensor $11_n$ not by the main CPU 20 that executes the applications requesting the sensor data but by the sub CPU 30 that, so to speak, exclusively acquires the sensor data.

Since the sub CPU 30 consumes little power although exhibiting inferior performance to the main CPU 20, lower power consumption than power consumed when the main CPU 20 acquires the sensor data can be achieved.

In addition, since the main CPU 20 may not (directly) access the sensor $11_n$ exhibiting a low communication speed, a load can be reduced, and the main CPU can be, so to speak, devoted to image processing, audio processing, communication processing, and other complicated processing performed to realize a favorable user interface.

As described above, in the mobile terminal of FIG. 3 and FIG. 4, the sub CPU 30 acquires the sensor data requested from each of the applications #1 to #3, not the main CPU 20 that executes the applications #1 to #3. In addition, the sub CPU 30 supplies the sensor data acquired from the sensor $11_n$ to the main CPU 20, and then the main CPU 20 provides the sensor data to the applications #1 to #3.

In this case, the timings at which the sensor data is acquired from the sensor $11_n$ are managed by the sub CPU 30, and the main CPU 20 is not involved therein. For this reason, the main CPU 20 has difficulty in recognizing at what timing of sampling cycle the sensor data supplied from the sub CPU 30 has been acquired, and may not know to which application the sensor data supplied from the sub CPU 30 should be provided.

Figure 5:
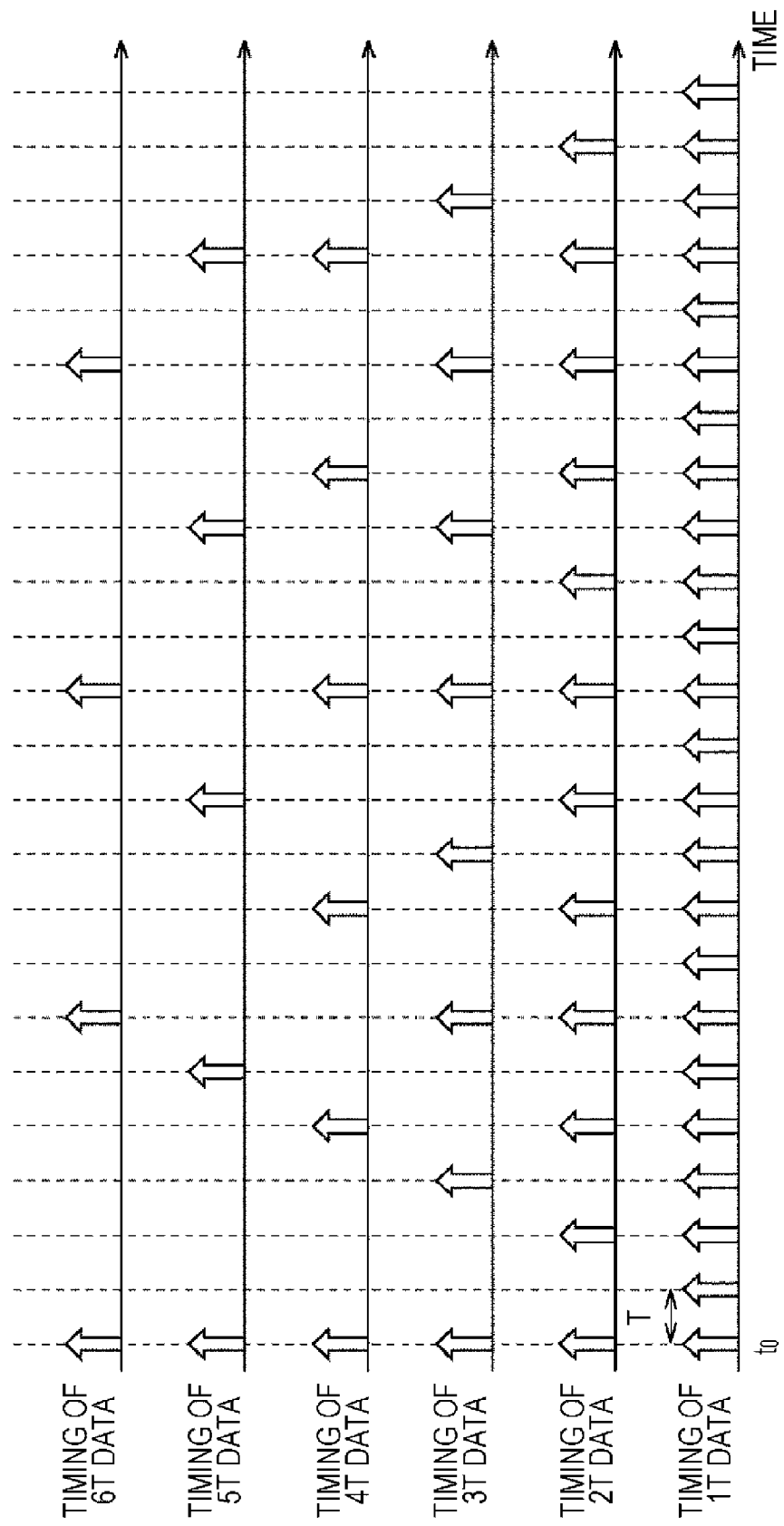
FIG. 5 is a diagram illustrating timings at which sensor data having sampling cycles of 1T to 6T is acquired (sampled).

FIG. 5 is a diagram illustrating timings at which sensor data having sampling cycles of 1T, 2T, 3T, 4T, 5T, and 6T is acquired (sampled).

In FIG. 5, the white arrows indicate the timings at which each of 1T data (sensor data having a sampling cycle of 1T), 2T data, 3T data, 4T data, 5T data, and 6T data is sampled (acquired).

With regard to the 1T data, sensor data is sampled from the sensor $11_n$ at each timing of a time (sampling cycle) 1T=T. In the same manner, with regard to k×T data, sensor data is sampled from the sensor $11_n$ at each timing of a time k×T.

Figure 6:
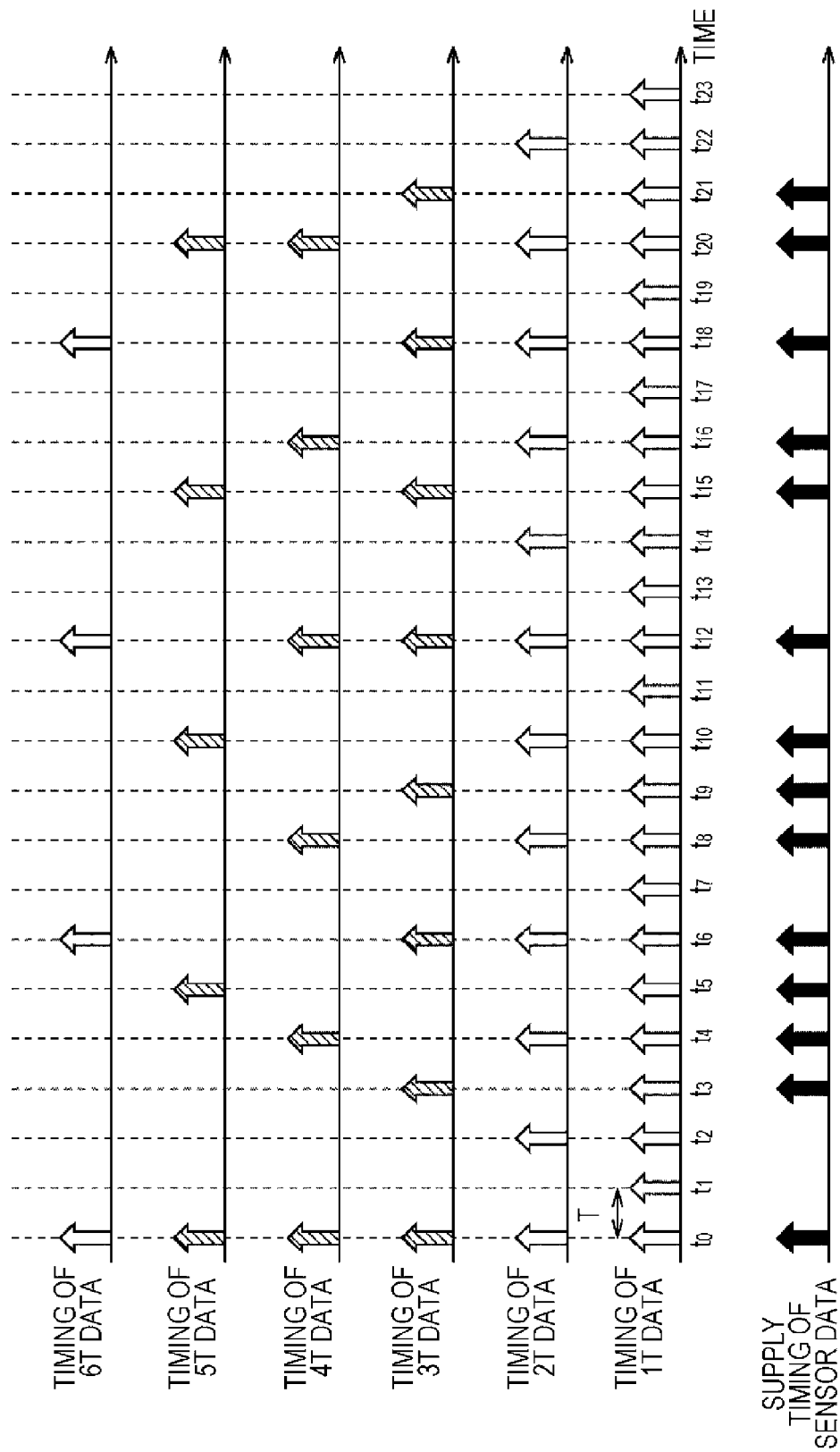
FIG. 6 is a diagram illustrating timings at which the sub CPU 30 performs sampling on sensor data from a sensor $11_n$.

FIG. 6 is a diagram illustrating timings at which the sub CPU 30 performs sampling on sensor data from the sensor $11_n$.

In other words, FIG. 6 illustrates the timings at which the sub CPU 30 samples the sensor data from the sensor $11_n$ when there are requests for each of the 3T data, 4T data, and 5T data (sensor data having the sampling cycles of 3T, 4T, and 5T) from the applications #1 to #3 as shown in FIG. 4.

The sub CPU 30 generates, for example, (signals indicating) the timings of each of the sampling cycles of 3T, 4T, and 5T, and samples the sensor data from the sensor $11_n$ at the timings.

In FIG. 6, the timings at which the sensor data is sampled from the sensor $11_n$ are indicated by shaded arrows.

As shown in FIG. 6, there are cases in which the timings of each of the sampling cycles of 3T, 4T, and 5T coincide, and do not coincide.

Thus, there are cases in which the sensor data sampled by the sub CPU 30 from the sensor $11_n$ corresponds to any one of the 3T data, 4T data, and 5T data, any two of the 3T data, 4T data, and 5T data, and all of the 3T data, 4T data, and 5T data.

After the sub CPU 30 samples the sensor data from the sensor $11_n$, the sub CPU supplies the sensor data to the main CPU 20.

When the timing of sampling cycle corresponds to at least one of the sampling cycles of 3T, 4T, and 5T, the sub CPU 30 samples the sensor data from the sensor $11_n$ and supplies the data to the main CPU 20.

For this reason, the timings at which the sensor data is supplied from the sub CPU 30 to the main CPU 20 are random timings at a glance as indicated by the black arrows in FIG. 6.

It is necessary for the main CPU 20 to recognize (one or more) applications to which the sensor data supplied at random timings at a glance should be provided by the sub CPU 30 as described above.

Here in FIG. 6 (also in FIG. 8 to be described later), a time at which all timings of the sampling cycles of 1T to 6T coincide is set to be a time $t_0$, and a time after m times of the reference cycle T elapses from the time $t_0$ is indicated by a time $t_m$.

In FIG. 6, times corresponding to the timings of at least one the sampling cycles of 3T, 4T, and 5T are times $t_0$, $t_3$, $t_4$, $t_5$, $t_6$, $t_8$, $t_9$, $t_{10}$, $t_{12}$, . . . .

In addition, with regard to the sampling cycles of 3T, 4T, and 5T, for example, the time $t_0$ corresponds to all of the timings of the sampling cycles of 3T, 4T, and 5T.

In addition, for example, the times $t_3$, $t_6$ and $t_9$ correspond to the timing of the sampling cycle of 3T, the times $t_4$ and $t_8$ correspond to the timing of the sampling cycle of 4T, and the times $t_5$ and $t_{10}$ correspond to the timing of the sampling cycle of 5T, respectively.

Furthermore, for example, the time $t_{12}$ corresponds to the timing of each of the sampling cycles of 3T and 4T.

The main CPU 20 should provide the application #1 that has requested the sensor data having the sampling cycle of 3T with the sensor data supplied from the sub CPU 30 at the time corresponding to the timing of the sampling cycle of 3T.

In the same manner, the main CPU 20 should provide the application #2 that has requested the sensor data having the sampling cycle of 4T with the sensor data supplied from the sub CPU 30 at the time corresponding to the timing of the sampling cycle of 4T, and should provide the application #3 that has requested the sensor data having the sampling cycle of 5T with the sensor data supplied from the sub CPU 30 at the time corresponding to the timing of the sampling cycle of 5T.

However, it is difficult for the main CPU 20 to instantly recognize at what timing of sampling cycle the sensor data is sampled only using the sensor data supplied from the sub CPU 30. For this reason, the main CPU 20 may not know to which application the sensor data supplied from the sub CPU 30 should be provided.

Since the main CPU 20 recognizes that each of the applications #1 to #3 has requested the 3T data, 4T data, and 5T data, the main CPU 20 observes the timings at which the sensor data is supplied from the sub CPU 30 over a given period of time, and thereby can perform sensor data estimation of estimating to which sampling cycle among 3T, 4T, and 5T the sensor data supplied at a given timing corresponds.

However, when the sensor data estimation is performed, it is difficult for the main CPU 20 to provide sensor data to an application that has requested the sensor data until an estimation result of the sensor data estimation is obtained. Therefore, the application is not able to immediately use the sensor data after being activated.

As a method of the main CPU 20 for instantly recognizing at what timing of sampling cycle the sensor data supplied from the sub CPU 30 is sampled, for example, there is a method in which the sub CPU 30 samples the sensor data from the sensor $11_n$ at the timing of the reference cycle T and then supplies the data to the main CPU 20.

In this case, since the sensor data is supplied from the sub CPU 30 to the main CPU 20 at the timing of the reference cycle T, the main CPU 20 can recognize at what timing of sampling cycle the sensor data supplied from the sub CPU 30 is sampled in the same manner as in the cases of FIG. 1 and FIG. 2 in which the sensor $11_n$ is directly connected to the main CPU 20.

However, in this case, the sub CPU 30 samples the sensor data having sampling cycles requested from the applications and sensor data having sampling cycles not requested from the applications as well. Furthermore, the sub CPU 30 supplies to the main CPU 20 the sensor data having sampling cycles requested from the applications and sensor data having sampling cycles not requested from the applications as well.

Accordingly, both the main CPU 20 and the sub CPU 30 perform processes that were originally unnecessary to be performed, and thus, loads increases, actual processing efficiency deteriorates, and power consumption increases.

<An Embodiment of a Mobile Terminal to which the Present Technology is Applied>

Figure 7:
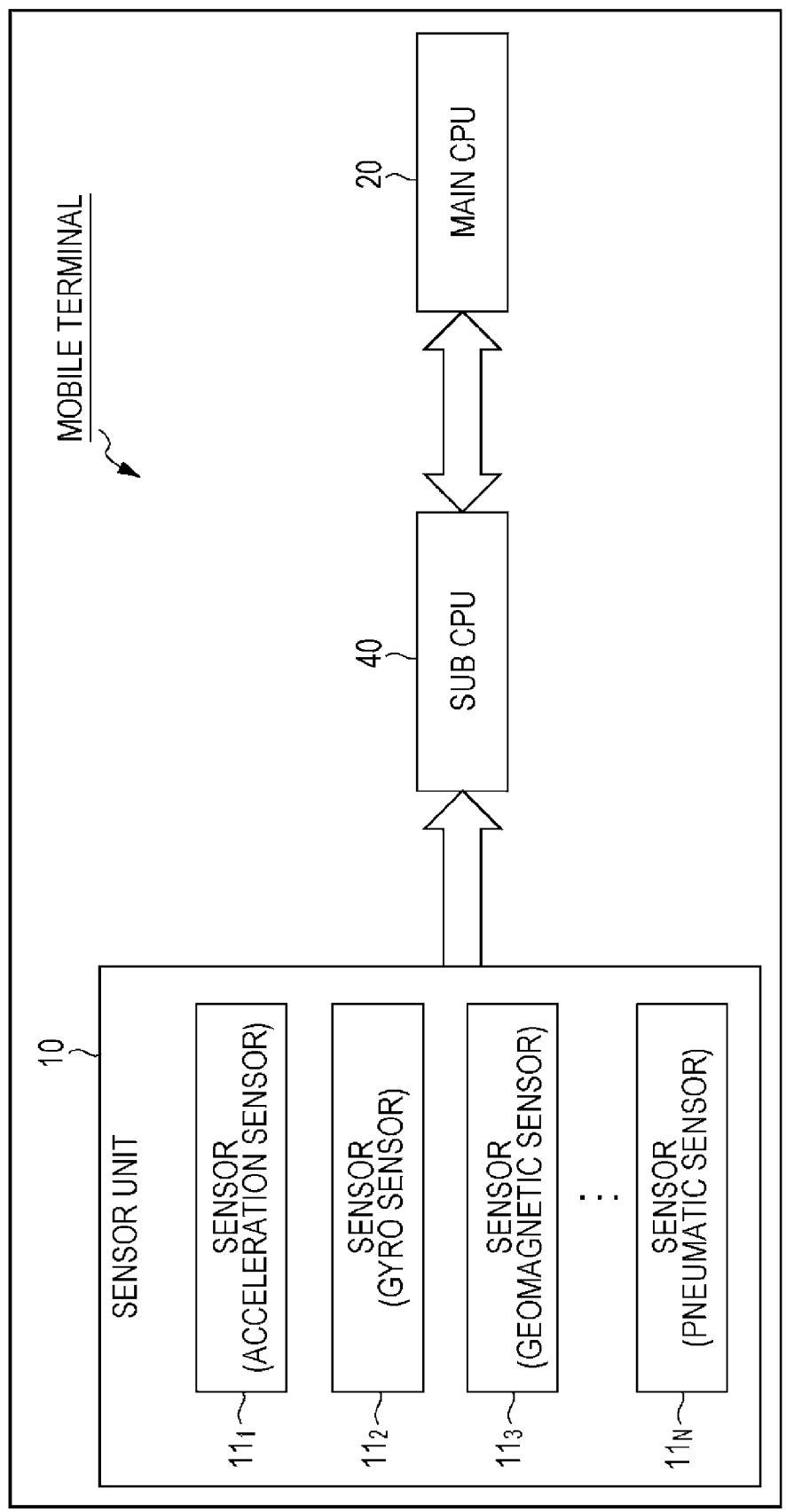
FIG. 7 is a block diagram illustrating a configuration example of an embodiment of a mobile terminal to which a data processing device of the present technology is applied.

FIG. 7 is a block diagram illustrating a configuration example of an embodiment of a mobile terminal to which a data processing device of the present technology is applied.

It should be noted that, in the drawing, the same reference numerals are given to constituent elements corresponding to those of FIG. 3, and description thereof will be appropriately omitted hereinbelow.

The mobile terminal of FIG. 7 is the same as that of FIG. 3 in that it has the sensor unit 10 and the main CPU 20. However, the mobile terminal of FIG. 7 is different from that of FIG. 3 in that a sub CPU 40 is provided instead of the sub CPU 30.

Like the sub CPU 30 of FIG. 3, the sub CPU 40 is a CPU which has a processing speed, and the like which are inferior to the main CPU 20 that executes various applications, but exhibits low power consumption, and at least takes charge of acquisition of sensor data.

In addition, the sub CPU 30 of FIG. 3 acquires sensor data from a necessary sensor $11_n$ according to a request from (the applications executed by) the main CPU 20, and only supplies the sensor data to the main CPU 20, but the sub CPU 40 supplies the sensor data and cycle information of the sensor data to the main CPU 20 as well.

The cycle information of sensor data is information indicating a sampling cycle corresponding to a timing at which the sensor data is sampled (acquired), that is, information indicating at what timing of sampling cycle the sensor data is sampled.

Here, the cycle information can be generated by allocating an index as identification information indicating a sampling cycle to the sampling cycle and using the index of the sampling cycle corresponding to a timing at which sensor data is sampled.

Figure 8:
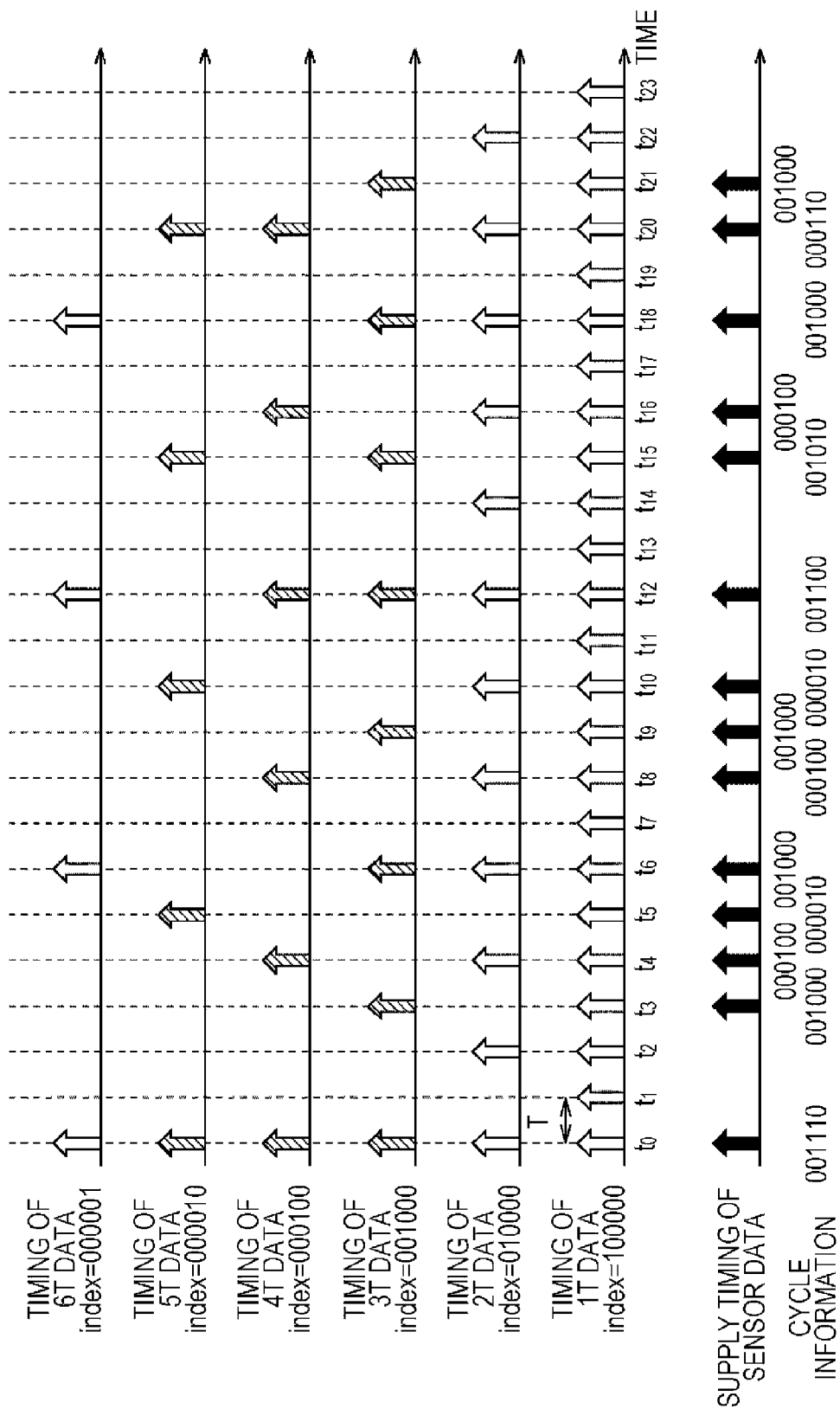
FIG. 8 is a diagram describing indices and cycle information of sampling cycles.

FIG. 8 is a diagram illustrating indices and cycle information of sampling cycles.

In other words, FIG. 8 illustrates timings at which sensor data is sampled in each of sampling cycles of 1T, 2T, 3T, 4T, 5T, and 6T.

In FIG. 8, the arrows indicate the timings at which sensor data is sampled in each of sampling cycles of 1T, 2T, 3T, 4T, 5T, and 6T.

As the indices of the sampling cycles, for example, sequential integers can be employed.

In addition, as an index of a sampling cycle, a bit string that is a bit string having the same number of bits as the (total) number of cycles that can be employed as sampling cycles, and of which only one bit is set (hereinafter, also referred to as 1-bit-on-bit string) can be employed. It should be noted that a cycle that can be employed as a sampling cycle can be decided in advance.

For example, as shown in FIG. 8, when 6 cycles of 1T, 2T 3T, 4T, 5T, and 6T can be employed as sampling cycles, and when 1-bit-on-bit string can be employed as an index of the sampling cycles, the index of the sampling cycles is a 6-bit bit string in which only one bit is set.

In FIG. 8, as an index of the sampling cycles of k×T (in FIG. 8, k=1, 2, 3, 4, 5, and 6), a 6-bit 1-bit-on-bit string in which $k^{th}$ bit from the most significant bit is set is employed.

In other words, in FIG. 8, 100000 is employed as an index of the sampling cycle of 1T, 010000 as an index of the sampling cycle of 2T, 001000 as an index of the sampling cycle of 3T, 000100 as an index of the sampling cycle of 4T, 000010 as an index of the sampling cycle of 5T, and 000001 as an index of the sampling cycle of 6T, respectively.

As the cycle information, for example, a series of indices of sampling cycles corresponding to timings at which the sensor data is sampled can be employed.

Here, as shown in FIG. 4, when the 3T data, 4T data, and 5T data (sensor data having the sampling cycles of 3T, 4T, and 5T) are requested from the applications #1 to #3, for example, the sub CPU 40 samples the sensor data from the sensor $11_n$ at the timings of each of the sampling cycles of 3T, 4T, and 5T (in FIG. 8, the timings indicated by the shaded arrows) in the same manner as in FIG. 6.

With regard to the sampling cycles of 3T, 4T, and 5T as described in FIG. 6, times corresponding to the timing of at least one sampling cycle out of the sampling cycles are times $t_0, t_3, t_4, t_5, t_6, t_8, t_9, t_{10}, t_{12}, \ldots$, and at the times, the sub CPU 40 samples the sensor data.

Here, for example, the time $t_0$ corresponds to all timings of the sampling cycles of 3T, 4T, and 5T. Thus, sampling cycles corresponding to the timings at which sensor data of the time $t_0$ is sampled are 3T, 4T, and 5T.

In this manner, when the sampling cycles corresponding to the timings at which the sensor data is sampled are 3T, 4T, and 5T, and when a series of indices of the sampling cycles corresponding to the timings at which the sensor data is sampled is employed as cycle information, the cycle information is, for example, a bit string of 001000000100000010 having 6×3=18 bits for which the index 001000 of the sampling cycle of 3T, the index 000100 of the sampling cycle of 4T, and the index 000010 of the sampling cycle of 5T are arranged.

In addition, for example, the time $t_3$ corresponds to the timing of the sampling cycle of 3T, and thus, the sampling cycle corresponding to the timing at which the sensor data of the time $t_3$ is sampled is 3T.

In this manner, when the sampling cycles corresponding to the timing at which the sensor data is sampled is 3T, and when a series of indices of the sampling cycles corresponding to the timings at which the sensor data is sampled is employed as cycle information, the cycle information is, for example, a bit string of 001000 having 6×1=6 bits for which only the index 001000 of the sampling cycle of 3T is arranged.

As described above, when the series of the indices of the sampling cycles corresponding to the timings at which the sensor data is sampled is employed as the cycle information, a bit string as the cycle information is lengthened as the number of sampling cycles corresponding to the timings at which the sensor data is sampled increases.

Thus, when a 1-bit-on-bit string is employed for indices of sampling cycles, for example, the logical sum of the sampling cycles corresponding to the timings at which sensor data is sampled can be employed as the cycle information.

In this case, when the sampling cycles corresponding to the timings at which the sensor data is sampled are 3T, 4T, and 5T, like the sensor data sampled at the time $t_0$, for example, the cycle information is a 6-bit bit string of 001110 that is the logical sum of the index 001000 of the sampling cycle of 3T, the index 000100 of the sampling cycle of 4T, and the index 000010 of the sampling cycle of 5T.

In addition, when the sampling cycle corresponding to the timing at which the sensor data is sampled is 3T, like the sensor data sampled at the time $t_3$, for example, the cycle information is a 6-bit bit string of 001000 that is equal to the index 001000 of the sampling cycle of 3T.

When each of the 3T data, 4T data, and 5T data is requested from the applications #1 to #3, and when the timing corresponds to the timing of at least one sampling cycle of the sampling cycles of 3T, 4T, and 5T, the sub CPU 40 samples the sensor data from the sensor $11_n$, and supplies the data to the main CPU 20.

In this case, the timings at which the sensor data is supplied from the sub CPU 40 to the main CPU 20 are random timings at a glance as indicated by the black arrows in FIG. 8.

However, the sub CPU 40 supplies to the main CPU 20 the sensor data and the cycle information of the sensor data as well as shown in FIG. 8.

Thus, the main CPU 20 can easily recognize (one or more) applications to which the sensor data supplied from the sub CPU 40 at the random timings at a glance should be provided based on the cycle information.

In other words, in FIG. 8, since the time $t_{12}$ corresponds to the timings of the sampling cycles of, for example, 3T and 4T, the sub CPU 40 samples the sensor data from the sensor $11_n$ at the time $t_{12}$.

Since the sampling cycles corresponding to the timings at which the sensor data is sampled are 3T and 4T at the time $t_{12}$, the sub CPU 40 generates, as the cycle information, a 6-bit bit string of 001100 that is the logical sum of the index 001000 of the sampling cycle of 3T and the index 000100 of the sampling cycle of 4T.

Then, the sub CPU 40 supplies to the main CPU 20 the sensor data sampled at the time $t_{12}$, and the cycle information 001100 as well.

In this case, since, in the cycle information 001100 from the sub CPU 40, the third bit and the fourth bit from the most significant bit are set, the main CPU 20 can easily recognize that the sensor data from the sub CPU 40 is the 3T data and 4T data.

As a result, the main CPU 20 can provide the sensor data as the 3T data and 4T data supplied from the sub CPU 40 to the application #1 that has requested the 3T data and to the application #2 that has requested the 4T data respectively.

As described above, since the sub CPU 40 samples the sensor data from the sensor $11_n$ and supplies the sensor data and the cycle information to the main CPU 20, the main CPU 20 can recognize the sampling cycles corresponding to the timings at which the sensor data is sampled with reference only to the cycle information supplied from the sub CPU 40 without managing the timings at which the sensor data is sampled.

Furthermore, as when the sub CPU 40 samples the sensor data from the sensor $11_n$ at the timing of the reference cycle T and supplies the data to the main CPU 20 as described above, the sub CPU 40 does not sample sensor data having sampling cycles that are not requested from the applications other than the sensor data having the sampling cycles requested from the applications, sensor data having sampling cycles that are not requested from the applications other than the sensor data having the sampling cycles requested from the applications is not supplied from the sub CPU 40 to the main CPU 20.

Thus, in comparison to the case in which sensor data is sampled from the sensor $11_n$ and supplied to the main CPU 20 at the timing of the reference cycle T, the sub CPU 40 can attain a reduced load and low power consumption in acquisition (sampling and supply) of the sensor data.

In addition, since the sub CPU 40 samples the sensor data from the sensor $11_n$ and supplies the sensor data and the cycle information to the main CPU 20 according to requests from the (applications executed by) main CPU 20, the sub CPU can robustly respond to changes in sensor data that the main CPU 20 requests.

In other words, when the main CPU 20 newly requests provision (supply) of sensor data having a predetermined sampling cycle (sampling cycle different from the sampling cycles of the sensor data that has already been provided), the sub CPU 40 starts sampling of the sensor data also at the timing of the predetermined sampling cycle. In addition, the sub CPU 40 can generate new cycle information from the index of the sampling cycles of the sensor data that has already been provided and the predetermined sampling cycle, and thereby instantly start providing the new cycle information and the sensor data obtained from the sampling to the main CPU 20.

In addition, when the main CPU 20 requests cancellation of the provision of the sensor data having the predetermined sampling cycle from the sensor data having the sampling cycles that has already been provided, for example, the sub CPU 40 stops sampling of the sensor data of the timing of the predetermined sampling cycle, generates new cycle information from the index of sampling cycles of sensor data of which cancellation of provision has not been requested and the predetermined sampling cycle, and thereby can instantly start providing the new cycle information and the sensor data having the sampling cycles of which the cancellation of provision has not been requested to the main CPU 20.

Furthermore, by employing a 1-bit-on-bit string as an index of a sampling cycle and the logical sum of indices of sampling cycles corresponding to the timings at which sensor data is sampled as cycle information, the cycle information as an overhead of the sensor data supplied from the sub CPU 40 to the main CPU 20 can be suppressed so as to have the same data amount as a 1-bit-on-bit string that is the index of the sampling cycle. As a result, increases in loads and power consumption of the main CPU 20 and the sub CPU 40 caused by exchange of cycle information in addition to sensor data can be suppressed.

Figure 9:
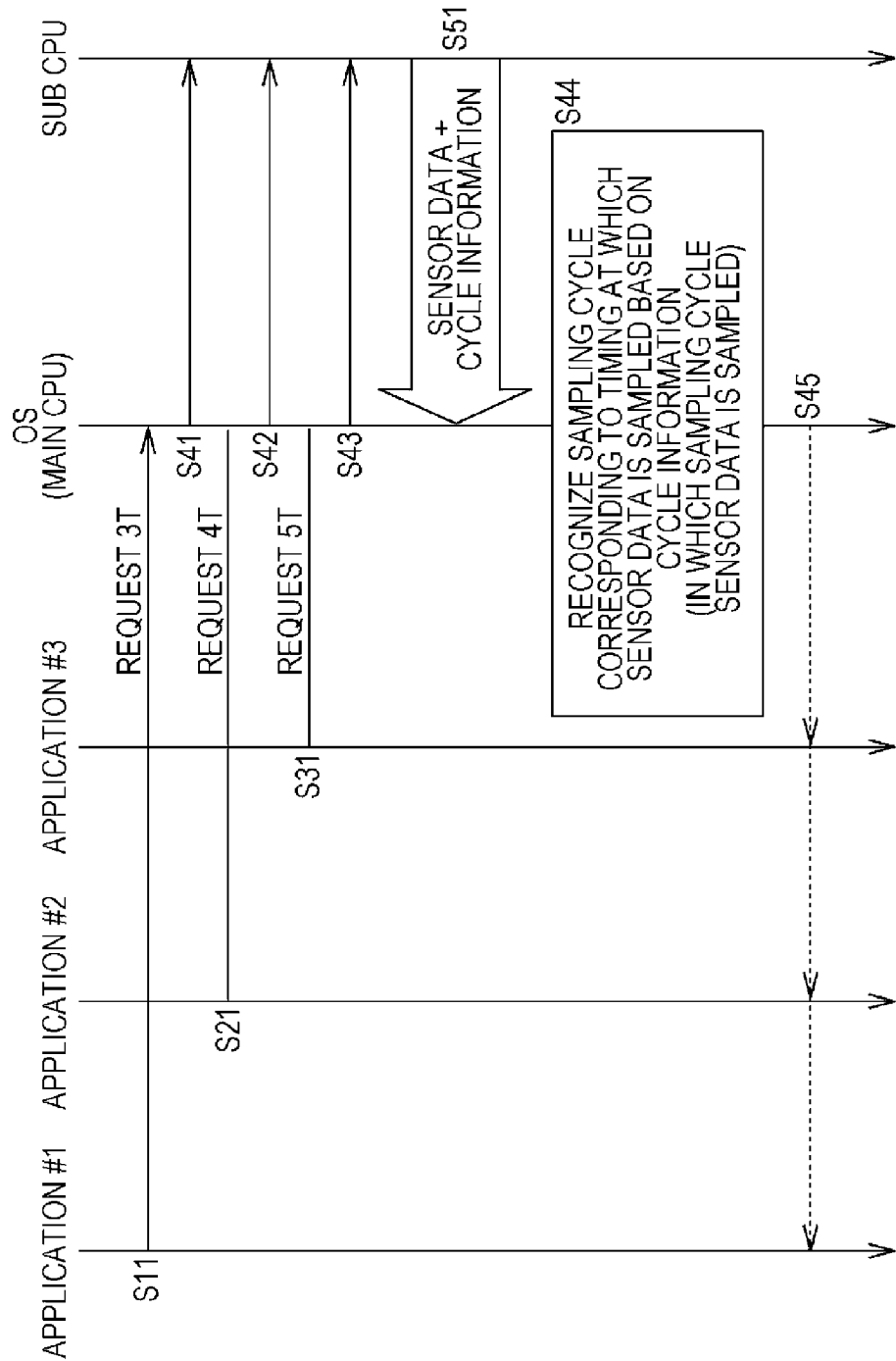
FIG. 9 is a diagram describing a process of the mobile terminal.

FIG. 9 is a diagram describing a process of the mobile terminal of FIG. 7.

In FIG. 9, in the main CPU 20, the applications #1 to #3 are executed. In addition, the application #1 makes a request to the OS for provision of the 3T data in Step S11, and the application #2 makes a request to the OS for the provision of the 4T data in Step S21. Furthermore, the application #3 makes a request to the OS for provision of the 5T data in Step S31.

The OS receives the request for the provision of the 3T data from the application #1, and makes a request to the sub CPU 40 for the provision of the 3T data according to the request for the provision of the 3T data from the application #1 in Step S41.

In addition, the OS receives the request for the provision of the 4T data from the application #2, and the request for the provision of the 5T data from the application #3.

In addition, the OS makes a request to the sub CPU 40 for the provision of the 4T data according to the request for the provision of the 4T data from the application #2 in Step S42. Furthermore, the OS makes a request to the sub CPU 40 for the provision of the 5T data according to the request for the provision of the 5T data from the application #3 in Step S43.

The sub CPU 40 receives the requests for the 3T data, 4T data, and 5T data from the OS (the main CPU 20), and according to the requests, starts sampling of sensor data from the sensor 11$_n$ at the timings of each of the sampling cycles 3T, 4T, and 5T, in other words, the timings indicated by the shaded arrows in FIG. 8.

When the sensor data is sampled, the sub CPU 40 generates cycle information of the sensor data. Then, the sub CPU 40 supplies (transmits) the sensor data and the cycle information to the OS (the main CPU 20) in Step S51.

The OS receives the sensor data and the cycle information from the sub CPU 40, and recognizes the sampling cycle corresponding to the timing at which the sensor data from the sub CPU 40 is sampled based on the cycle information in Step S44.

Then, in Step S45, the OS supplies the sensor data from the sub CPU 40 to the application that has requested the sensor data having the sampling cycle recognized from the cycle information from the sub CPU 40 out of the applications #1 to #3 that have requested the sensor data.

The processes of Step S51 by the sub CPU 40, and Step S44 and Step S45 by the main CPU 20 are performed every time the sub CPU 40 samples sensor data and generates cycle information of the sensor data.

<Configuration Example of First Hardware of the Sub CPU 40>

Figure 10:
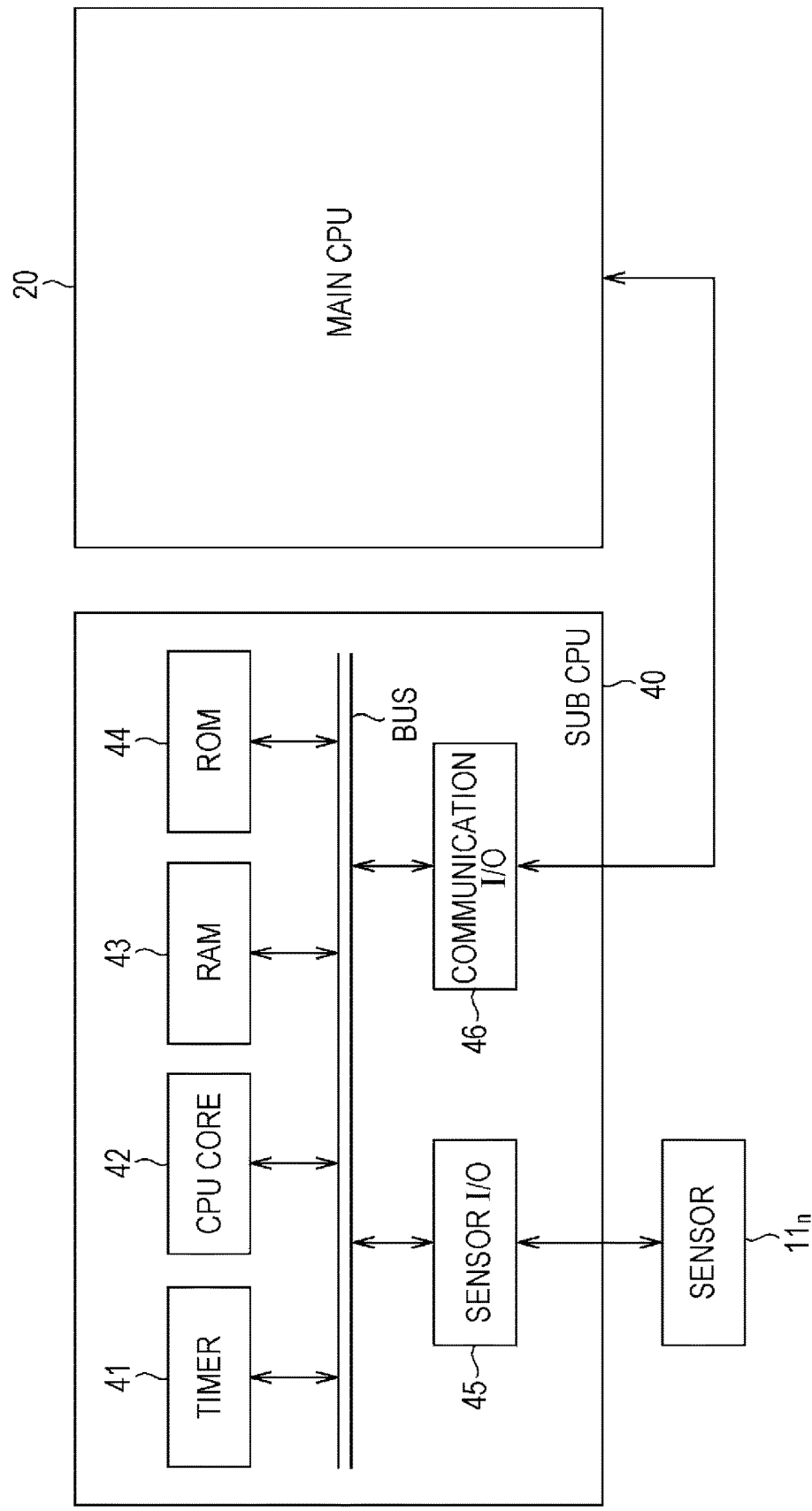
FIG. 10 is a block diagram illustrating a configuration example of first hardware of the sub CPU 40.

FIG. 10 is a block diagram illustrating a configuration example of first hardware of the sub CPU 40 of FIG. 7.

In FIG. 10, the sub CPU 40 has a timer 41, a CPU core 42, a random access memory (RAM) 43, a read only memory (ROM) 44, a sensor I/O 45, and a communication I/O 46. In addition, a bus is connected from the timer 41 to the communication I/O 46.

The timer 41 measures (counts) time.

The CPU core 42 mainly performs a process of acquiring sensor data, in other words, a process of sampling sensor data from the sensor 11$_n$ and supplying the data to the main CPU 20 by executing a program stored in the ROM 44.

The RAM 43 temporarily stores data, and the like necessary for operating the CPU core 42. In the data stored in the RAM 43, a management table to be described later is included.

The ROM 44 stores the OS, predetermined applications (programs), and the like. In the applications stored in the ROM 44, at least a sensor data providing program for performing a process of acquiring and providing sensor data (program for causing the sub CPU 40 to function as a data processing device that acquires and provides sensor data) is included.

The sensor I/O 45 is an interface for access to the sensor 11$_n$, and receives (samples) sensor data from the sensor 11$_n$.

The communication I/O 46 is an interface for performing communication between the main CPU 20.

Here, the main CPU 20 is configured the same as the sub CPU 40.

However, the timer 41 and the sensor I/O 45 are not necessary for the main CPU 20. In addition, with regard at least to the CPU core 42, a product exhibiting higher performance than that of the sub CPU 40 is used in the main CPU 20. Furthermore, with regard to the RAM 43 and the ROM 44, products exhibiting higher performance than those of the sub CPU 40 are used in the main CPU 20, if necessary.

In addition, in the sub CPU 40, a rewritable memory such as a flash memory can be employed instead of the ROM 44. Programs (including the OS) stored in such a rewritable memory employed instead of the ROM 44 can be downloaded via the communication I/O 46 from, for example, the Internet, and the like, installed, and updated.

In addition, in the mobile terminal having the main CPU 20 and the sub CPU 40, programs from the Internet or a removable recording medium are installed in a storage such as a hard disk, and the like included in the mobile terminal but not illustrated, and the main CPU 20 and the sub CPU 40 can execute the programs installed in this manner.

In the sub CPU 40 configured as illustrated in FIG. 10, the CPU core 42 executes the sensor data providing program stored in the ROM 44 so as to sample sensor data from the sensor 11$_n$, and performs the sensor data providing process for providing (supplying) the sampled data to the main CPU 20.

In the sensor data providing process, the sub CPU 40 samples sensor data from the sensor 11$_n$ according to a request from the main CPU 20. Furthermore, the sub CPU 40 generates cycle information of the sensor data sampled from the sensor 11$_n$, and provides the information and the sensor data to the main CPU 20.

In the sensor data providing process, sampling of the sensor data from the sensor 11$_n$ and provision (supply) of the sampled data to the main CPU 20 are managed according to the management table.

The management table is developed (stored) in the RAM 43 when the CPU core 42 executes the sensor data providing program.

FIG. 11 is a diagram illustrating the management table.

The management table is registered with sampling cycles of sensor data that the sub CPU 40 can sample. In FIG. 11, as the sampling cycles, 6 cycles of 1T, 2T, 3T, 4T, 5T, and 6T are registered.

In the management table, indices, request flags, initial values, and remaining count values are further registered in association with the sampling cycles.

In the management table, the indices associated with the sampling cycles are indices of the sampling cycles (indices indicating the sampling cycles). In FIG. 11, with regard to the sampling cycles, the same 1-bit-on-bit string as described in FIG. 8 is registered as an index of each sampling cycle.

The request flags associated with the sampling cycles are 1-bit flags indicating, for example, whether or not provision of sensor data of the sampling cycle has been requested. When provision of sensor data of a predetermined sampling cycle is requested, the request flag associated with the sampling cycle is on (for example, 1 out of 0 and 1). In addition, when the provision of the sensor data of the predetermined sampling cycle is not requested (when provision of the sensor data is cancelled), the request flag associated with the sampling cycle is off (for example, 0 out of 0 and 1).

The initial values associated with the sampling cycles are initial values set for the remaining count values associated with the sampling cycles. In other words, when the remaining count value associated with a predetermined sampling cycle is set to be 0, the remaining count value is initialized to be the initial value associated with the predetermined sampling cycle.

Remaining count values associated with the sampling cycles are decremented by one per each reference cycle T. Based on the decrementing of the remaining count values, each sampling cycle registered in the management table is counted.

Here, in the present embodiment, a sampling cycle of sensor data is indicated by k×T that is the integral multiple k of the reference cycle T, and for the initial value associated with the sampling cycle k×T, k is employed.

The remaining count value associated with the sampling cycle k×T is initialized to be the initial value k, and then, decremented by one per reference cycle T.

As a result, the timing at which the remaining count value associated with the sampling cycle k×T becomes 0 is the timing of the sampling cycle k×T.

Figure 12:
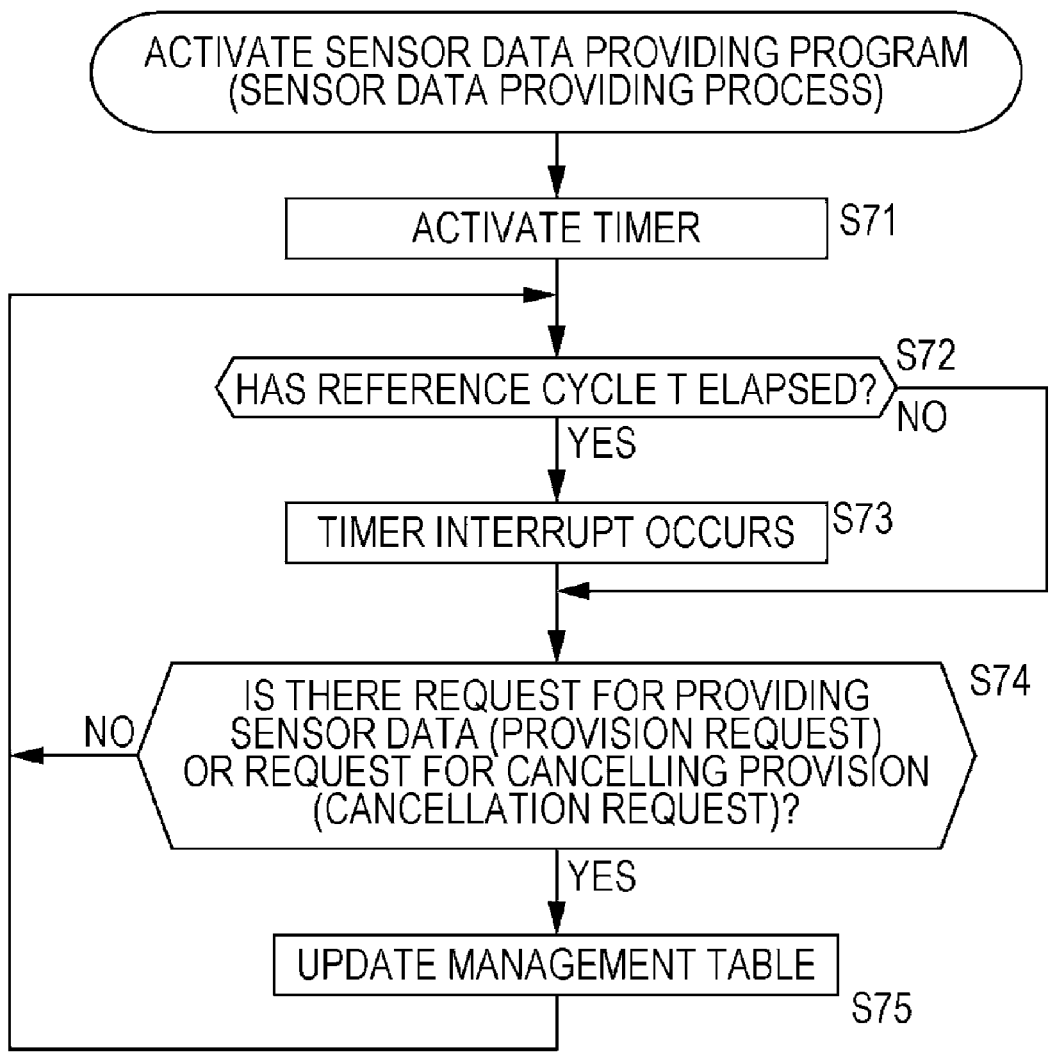
FIG. 12 is a flowchart describing a sensor data providing process performed by the sub CPU 40 when a CPU core 42 executes a sensor data providing program.

FIG. 12 is a flowchart describing a sensor data providing process performed by the sub CPU 40 when the CPU core 42 of FIG. 10 executes the sensor data providing program.

The CPU core 42 executes the sensor data providing program after the sub CPU 40 is activated, and accordingly, the sub CPU 40 performs the sensor data providing process.

In the sensor data providing process, the management table (of FIG. 11) is stored in the RAM 43. It should be noted that, immediately after the start of the sensor data providing process, for example, all request flags of the management table are off, and the remaining count values of the management table are all initialized to be initial values.

In the sensor data providing process, in Step S71, the CPU core 42 activates the timer 41, and accordingly, the timer 41 starts iterative measurement of the reference cycle T.

Then, the process proceeds to Step S72 from Step S71, and the CPU core 42 determines whether or not the reference cycle T has elapsed (from the activation of the timer 41 or previous measurement of the reference cycle T by the timer 41).

When the reference cycle T is determined not to have elapsed in Step S72, the process skips Step S73, and proceeds to Step S74.

In addition, in Step S72, when the reference cycle T is determined to have elapsed, the process proceeds to Step S73, the CPU core 42 generates timer interrupt, and the process proceeds to Step S74. Here, with the occurrence of the timer interrupt, a timer interrupt process to be described later is performed.

In Step S74, the CPU core 42 determines whether or not there is a request for providing sensor data (provision request (command)) or a request for cancelling the provision of the sensor data (cancellation request (command)) from the main CPU 20.

When neither the provision request nor the cancellation request is determined to be made in Step S74, the process skips Step S75, returning to Step S72, and thereafter, the same process is repeated.

In addition, when either the provision request or the cancellation request is determined to be made in Step S74, the process proceeds to Step S75, the CPU core 42 updates the management table according to the provision request or the cancellation request, and the process returns to Step S72.

Here, when the provision request is present in updating of the management table of Step S75, the request flag associated with the sampling cycle of sensor data for which provision is requested according to the provision request is set to be on indicating the provision of the sensor data in the management table. Furthermore, the remaining count value associated with the sampling cycle of the sensor data for which provision is requested according to the provision request is initialized to be the initial value.

In addition, when there is the cancellation request, the request flag associated with the sampling cycle of sensor data for which cancellation of the provision is requested according to the cancellation request is set to be off indicating the cancellation (cancelling) of the provision of the sensor data in the management table.

Figure 13:
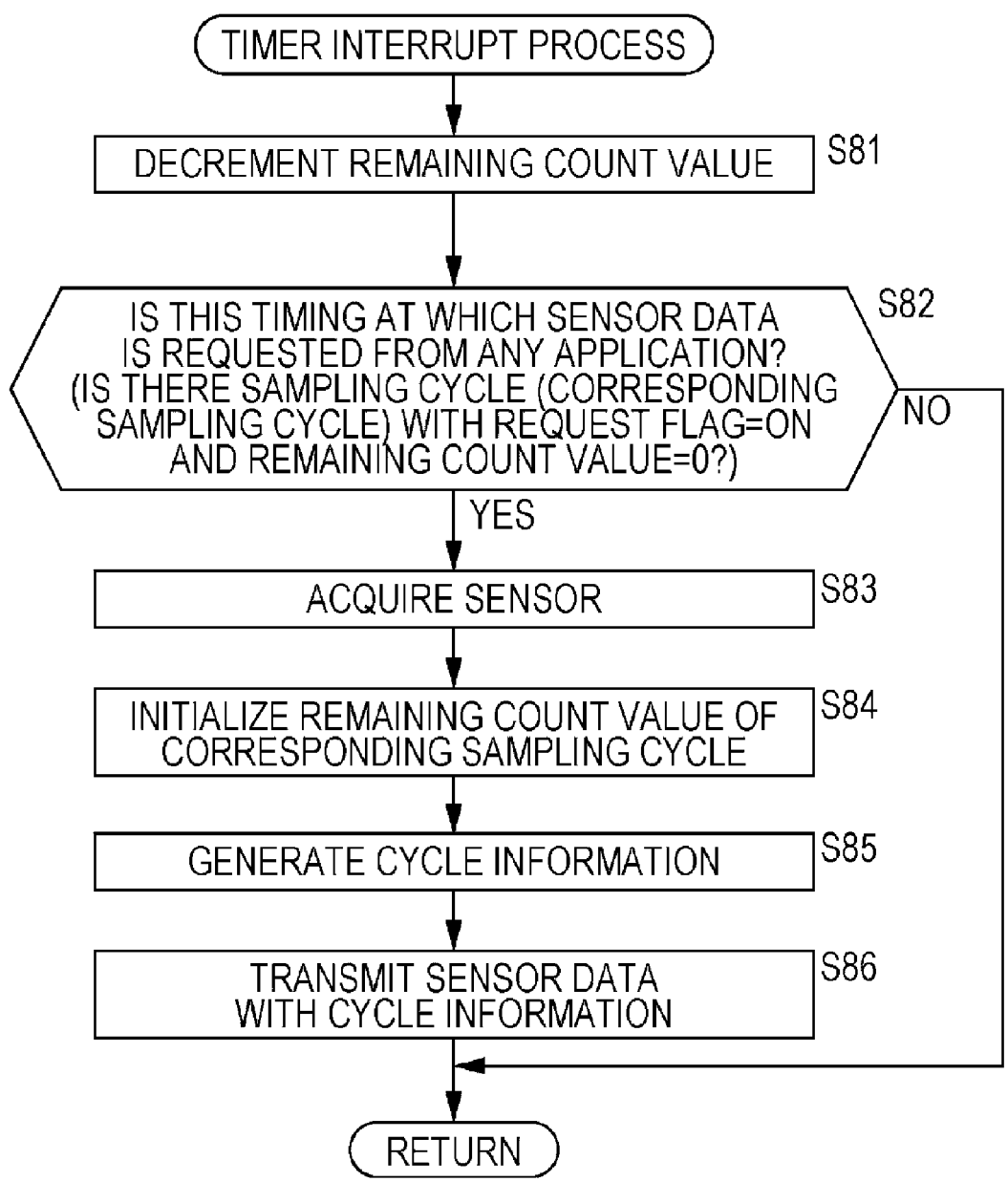
FIG. 13 is a flowchart describing a timer interrupt process.

FIG. 13 is a flowchart describing the timer interrupt process performed according to the occurrence of the timer interrupt of Step S73 of FIG. 12.

In the timer interrupt process, in Step S81, the CPU core 42 decrements all remaining count values of the management table (of FIG. 11) by one, and the process proceeds to Step S82.

In Step S82, the CPU core 42 determines whether or not a current timing is a timing at which sensor data is requested from any application executed by the main CPU 20 with reference to the management table.

In Step S82, when it is determined not to be the timing at which the sensor data is requested from any application, the timer interrupt process ends and returns.

In addition, in Step S82, when it is determined to be the timing at which the sensor data is requested from any application, in other words, a sampling cycle (hereinafter, referred to as a corresponding sampling cycle) of which the request flag is on and the remaining count value is 0 in the management table (of FIG. 11) is present, the process proceeds to Step S83, and the CPU core 42 controls the sensor I/O to cause the sensor data to be acquired from the sensor $11_n$, and the process proceeds to Step S84.

In Step S84, the CPU core 42 initializes the remaining count value associated with the corresponding sampling cycle in the management table to be the initial value associated with the corresponding sampling cycle, and the process proceeds to Step S85.

Here, the number of sampling cycles serving as the corresponding sampling cycle is not limited to be one, and there is a case in which a plurality of sampling cycles serve as the corresponding sampling cycle. When the plurality of sampling cycles serve as the corresponding sampling cycle, remaining count values are initialized for each of the plurality of sampling cycles serving as the corresponding sampling cycle in Step S84.

In Step S85, the CPU core 42 recognizes the indices of (the sampling cycle serving as) the corresponding sampling cycle with reference to the management table, and obtains the logical sum of the indices as cycle information of the sensor data acquired in Step S83, and the process proceeds to Step S86.

In Step S86, the CPU core 42 adds the cycle information generated in Step S85 to the sensor data acquired in, for example, Step S83 so as to be summarized as one data piece, and transmits the data to the main CPU 20 by controlling the communication I/O 46, and the timer interrupt process ends and returns.

<Other Example of Indices and Cycle Information>

Figure 14:
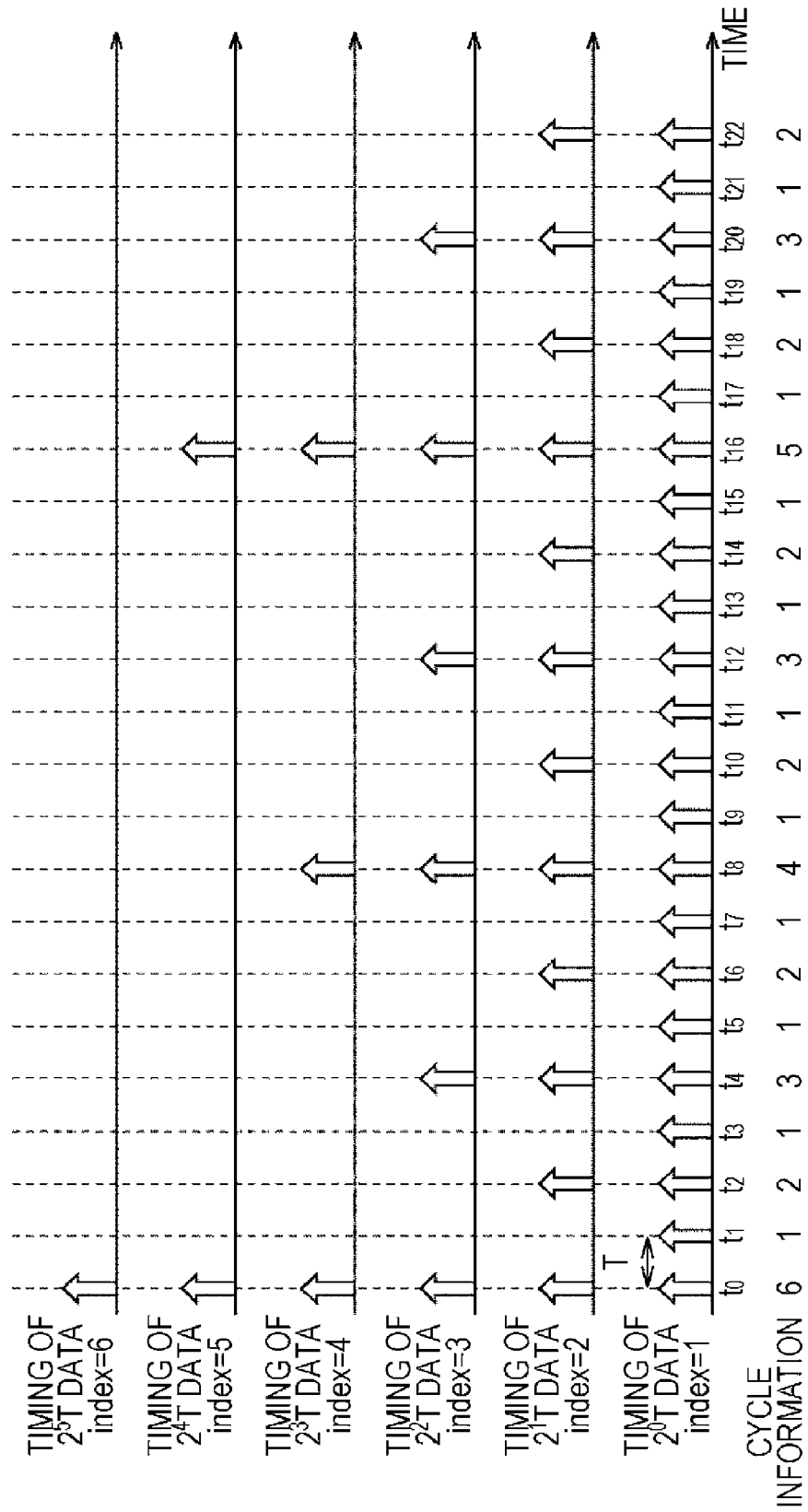
FIG. 14 is a diagram illustrating indices and cycle information of sampling cycles.

FIG. 14 is a diagram illustrating indices and cycle information of sampling cycles.

In FIG. 8, as sampling frequencies, 1T, 2T, 3T, 4T, 5T, and 6T which are cycles of an integral multiple k of the reference cycle T obtained by increasing one cycle are employed, however, in addition to them, as sampling cycles, for example, $2^0 \times T$, $2^1 \times T$, $2^2 \times T$, $2^3 \times T$, $2^4 \times T$, and $2^5 \times T$ which are cycles of powers of two $2^k$ of the reference cycle T can be employed.

FIG. 14 illustrates timings (portions indicated by the arrows in the drawing) at which sensor data is sampled when each of $2^0 \times T$, $2^1 \times T$, $2^2 \times T$, $2^3 \times T$, $2^4 \times T$, and $2^5 \times T$ which are cycles of powers of two $2^k$ of the reference cycle T is set to be a sampling cycle.

In FIG. 14, a time at which all timings of the sampling cycles of $2^0 \times T$ to $2^5 \times T$ coincide is set to be a time $t_0$, and a time after m times of the reference cycle T elapses from the time $t_0$ is indicated by a time $t_m$.

As in FIG. 14, when the cycle of a power of two $2^k$ of the reference cycle T are employed as sampling cycles, it is difficult to designate the sampling cycles to be in units of the reference cycle T as, for example, 1T, 2T, 3T, 4T, 5T, and 6T, but it is possible to designate sampling cycles from a wide range of cycles, for example, $2^0 \times T$ to $2^5 \times T$ in comparison to the case in which the cycles of the integral multiples k of the reference cycle T obtained by increasing one cycle are employed to be the sampling cycles as in FIG. 8.

In FIG. 14, as the indices of the sampling cycles, for example, sequential integers are employed.

In other words, in FIG. 14, for example, 1 is employed as the index of the sampling cycle of $2^0 \times T$, 2 is employed as the index of the sampling cycle of $2^1 \times T$, 3 is employed as the index of the sampling cycle of $2^2 \times T$, 4 is employed as the index of the sampling cycle of $2^3 \times T$, 5 is employed as the index of the sampling cycle of $2^4 \times T$, and 6 is employed as the index of the sampling cycle of $2^5 \times T$, respectively.

When such sequential integers are employed as the indices of the sampling cycles, a series of the indices of the sampling cycles corresponding to the timings at which the sensor data is sampled as described in, for example, FIG. 8 can be employed as cycle information.

In this case, in FIG. 14, when a time $t_8$ corresponds to the timings of each of the sampling cycles of $2^0 \times T$, $2^1 \times T$, $2^2 \times T$, and $2^3 \times T$, and thus the sensor data is sampled at the time $t_8$, for example, cycle information of the sensor data is 1234 obtained by arranging the index 1 of the sampling cycle of $2^0 \times T$, the index 2 of the sampling cycle of $2^1 \times T$, the index 3 of the sampling cycle of $2^2 \times T$, and the index 4 of the sampling cycle of $2^3 \times T$.

However, when $2^0 \times T$ to $2^5 \times T$ which are the cycles $2^k$ which are power of two of the reference cycle T are employed for the sampling cycles as shown in FIG. 14, the timing of a certain sampling cycle $2^A \times T$ of power of 2 $2^A$ of the reference cycle T is necessarily inclusive of the timing of a sampling cycle $2^B \times T$ of power of 2 $2^B$ of the reference cycle T which is less than $2^A$ (A>B).

In other words, in FIG. 14, for example, the time $t_8$ corresponds to the timing of the sampling cycle $2^3 \times T$, and certainly corresponds also to the timings of the sampling cycles $2^0 \times T$, $2^1 \times T$, and $2^2 \times T$ less than the sampling cycle $2^3 \times T$.

In addition, for example, the time $t_4$ (as well as the times $t_{12}$ and $t_{20}$) corresponds to the timing of the sampling cycle $2^2 \times T$, and certainly corresponds also to the timings of the sampling cycles $2^0 \times T$, and $2^1 \times T$ less than the sampling cycle $2^2 \times T$.

As described above, when $2^0 \times T$ to $2^5 \times T$ which are the cycles $2^k$ which are power of two of the reference cycle T are employed for the sampling cycles, the timing of a certain sampling cycle $2^A \times T$ is necessarily inclusive of the timing of a sampling cycle $2^B \times T$ which is less than the sampling cycle $2^A \times T$. Thus, when a series of the indices of the sampling cycle corresponding to the timings at which the sensor data is sampled is employed as the cycle information, the series of the indices of the sampling cycles as the cycle information can be compressed to be an index of the maximum sampling cycle.

In other words, since the timing $t_8$ corresponds to, for example, the timings of each of the sampling cycles $2^0 \times T$, $2^1 \times T$, $2^2 \times T$, and $2^3 \times T$ as described above, when the sensor data is sampled at the time $t_8$, the cycle information of the sensor data is 1234 obtained by arranging the index 1 of the sampling cycle of $2^0 \times T$, the index 2 of the sampling cycle of $2^1 \times T$, the index 3 of the sampling cycle of $2^2 \times T$, and the index 4 of the sampling cycle of $2^3 \times T$.

When the sensor data is sampled in the sampling cycles $2^0 \times T$, $2^1 \times T$, $2^2 \times T$, and $2^3 \times T$ corresponding to the timing $t_8$, in other words, at the timing $t_8$, the cycle information 1234 can be compressed to be the index 4 of the maximum sampling cycle of $2^3 \times T$ out of the sampling cycles $2^0 \times T$, $2^1 \times T$, $2^2 \times T$, and $2^3 \times T$ corresponding to the timings at which the sensor data is sampled.

When the main CPU 20 receives the cycle information 4 with the sensor data, the main CPU can recognize from the cycle information 4 that the timing at which the sensor data is sampled is the timing of the sampling cycle $2^3 \times T$ having 4 as the index, in other words, that the sensor data is sensor data sampled at the timing of the sampling cycle $2^3 \times T$ having 4 as the index.

Furthermore, the main CPU can also recognize from the fact that the timing sampling cycle $2^3 \times T$ is the timing at which the sensor data is sampled that the timing at which the sensor data is sampled is the timing of each of the sampling cycles $2^0 \times T$, $2^1 \times T$, and $2^2 \times T$ less than the sampling cycle $2^3 \times T$.

As described above, when the cycle of a power of 2 $2^k$ of the reference cycle T is employed as a sampling cycle, and cycle information is compressed to be the index of the maximum sampling cycle out of one or more sampling cycles corresponding to timings at which the sensor data is sampled, the cycle information when the sensor data is sampled at each time is as shown in FIG. 14.

In other words, cycle information of sensor data sampled at the time $t_1$ corresponding only to the timing of the sampling cycle $2^0 \times T$ is the index 1 of (the maximum sampling cycle $2^0 \times T$ out of) the sampling cycle $2^0 \times T$.

In addition, cycle information of sensor data sampled at the time $t_2$ corresponding only to the timings of the sampling cycles $2^0 \times T$ and $2^1 \times T$ is the index 2 of the maximum sampling cycle $2^1 \times T$ among the sampling cycles $2^0 \times T$ and $2^1 \times T$.

Furthermore, cycle information of sensor data sampled at the time $t_4$ corresponding only to the timings of the sampling cycles $2^0 \times T$, $2^1 \times T$, and $2^2 \times T$ is the index 3 of the maximum sampling cycle $2^2 \times T$ among the sampling cycles $2^0 \times T$ to $2^2 \times T$.

In addition, cycle information of sensor data sampled at the time $t_8$ corresponding only to the timings of the sampling cycles $2^0 \times T$, $2^1 \times T$, $2^2 \times T$, and $2^3 \times T$ is the index 4 of the maximum sampling cycle $2^3 \times T$ among the sampling cycles $2^0 \times T$ to $2^3 \times T$.

Furthermore, cycle information of sensor data sampled at the time $t_{16}$ corresponding only to the timings of the sampling cycles $2^0 \times T$, $2^1 \times T$, $2^2 \times T$, $2^3 \times T$, and $2^4 \times T$ is the index 5 of the maximum sampling cycle $2^4 \times T$ among the sampling cycles $2^0 \times T$ to $2^4 \times T$.

In addition, cycle information of sensor data sampled at the time $t_0$ corresponding only to all of the timings of the sampling cycles $2^0 \times T$, $2^1 \times T$, $2^2 \times T$, $2^3 \times T$, $2^4 \times T$, and $2^5 \times T$ is the index 6 of the maximum sampling cycle $2^5 \times T$ among the sampling cycles $2^0 \times T$ to $2^5 \times T$.

It should be noted that, in FIG. 14, the cycles of powers of 2 $2^k$ of the reference cycle T are employed as the sampling cycles in which the sensor data is acquired (sampled), but as sampling cycles, for example, cycles of powers of a predetermined integer of 3, 5, or the like other than 2 can be employed.

In addition, in FIG. 14, sequential integers are employed as the indices of the sampling cycles, but a 1-bit-on-bit string can also be employed in FIG. 14 as an index of a sampling cycle in the same manner as in FIG. 8.

<Configuration Example of Second Hardware of the Sub CPU 40>

Figure 15:
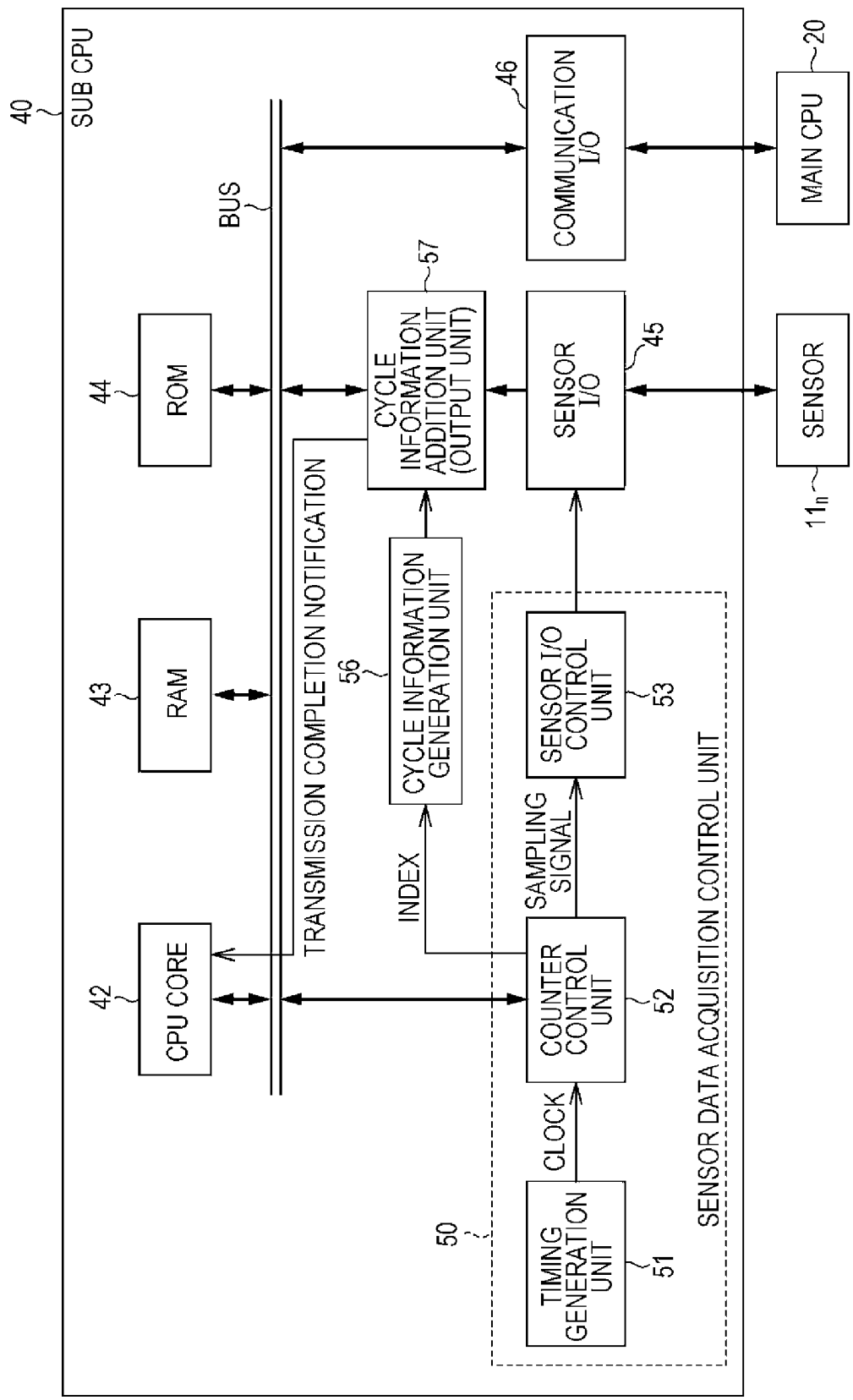
FIG. 15 is a block diagram illustrating a configuration example of second hardware of the sub CPU 40.

FIG. 15 is a block diagram illustrating a configuration example of second hardware of the sub CPU 40 of FIG. 7.

It should be noted that the same reference numerals are given to constituent elements corresponding to those of FIG. 10 in the drawing, and thus description thereof will be appropriately omitted thereinbelow.

In FIG. 15, the sub CPU 40 is the same as in FIG. 10 in that the sub CPU has the CPU core 42, the RAM 43, the ROM 44, the sensor I/O 45, and the communication I/O 46.

However, in FIG. 15, the sub CPU 40 is different from the case of FIG. 10 in that it has a sensor data acquisition control unit 50, a cycle information generation unit 56, and a cycle information addition unit 57, not having the timer 41.

Here, the sub CPU 40 of FIG. 10 determines the timing at which an application requests sensor data (Step S82 of FIG. 13), in other words, generates the timing at which the sensor data is sampled using software, in other words, by the CPU core 42 executing the sensor data providing program, but the generation of the timing at which the sensor data is sampled can be attained using hardware.

In FIG. 15, the generation of the timing at which the sensor data is sampled is performed by (a timing generation unit 51 and a counter control unit 52 to be described later forming a part of) the sensor data acquisition control unit 50 that is hardware.

In addition, the sub CPU 40 of FIG. 10 controls the acquisition of the sensor data by the sensor I/O 45 using software (Step S83 of FIG. 13), but the control of acquisition of sensor data by the sensor I/O 45 can be performed using hardware.

In FIG. 15, the control of acquisition of sensor data by the sensor I/O 45 is performed by (a sensor I/O control unit 53 to be described later forming a part of) the sensor data acquisition control unit 50 that is hardware.

Furthermore, the sub CPU 40 of FIG. 10 adds cycle information of the sensor data to the sensor data using software, but the addition of cycle information to sensor data can be performed using hardware.

In FIG. 15, the cycle information addition unit 57 that is hardware adds cycle information to sensor data, and the sensor data to which the cycle information is added is stored in the RAM 43.

As described above, by performing some of the processes that were originally performed using software in FIG. 10 using hardware, a load on the CPU core 42 can accordingly be reduced, and low power consumption can be attained.

In FIG. 15, the sensor data acquisition control unit 50 controls the sensor I/O 45 to acquire sensor data from the sensor $11_n$ at timings of sampling cycles requested from (the applications of) the main CPU 20.

In other words, the sensor data acquisition control unit 50 has the timing generation unit 51, the counter control unit 52, and the sensor I/O control unit 53.

The timing generation unit 51 generates a clock signal for the reference cycle T and supplies the clock signal to the counter control unit 52.

The counter control unit 52 is connected to a bus, and requests for provision of sensor data (provision request) and for cancellation of the provision of sensor data (cancellation request) from the main CPU 20 are supplied to the counter control unit 52 via the communication I/O 46 and the bus.

The counter control unit 52 includes a counter not illustrated, and clock signals from the timing generation unit 51 are counted by the counter.

In addition, the counter control unit 52 generates a timing signal indicating the timing of a sampling cycle of the sensor data for which a provision request is made and a cancellation request has not been made from the main CPU 20 based on the counted value of the counter, and supplies the signal to the sensor I/O control unit 53.

Furthermore, the counter control unit 52 supplies the index of the sampling cycle corresponding to the timings indicated by the timing signal to the cycle information generation unit 56.

The sensor I/O control unit 53 controls the sensor I/O 45 to acquire the sensor data from the sensor $11_n$ according to the timing signal supplied from the counter control unit 52.

Here, in FIG. 15, the sensor I/O 45 acquires (samples) the sensor data according to the control of the sensor I/O control unit 53, and the sensor data is supplied from the sensor I/O 45 to the cycle information addition unit 57.

The cycle information generation unit 56 generates cycle information from the index of the sampling cycle from the counter control unit 52, and supplies the information to the cycle information addition unit 57.

Here, as cycle information, a series of indices of sampling cycles or the logical sum of the indices can be employed as described above. In addition, when the series of the indices of the sampling cycles is used as cycle information, the cycle information can be compressed if it can be as described above.

The cycle information addition unit 57 also functions as an output unit that outputs the sensor data supplied from the sensor I/O 45 with the cycle information supplied from the cycle information generation unit 56.

In other words, the cycle information addition unit 57 adds the cycle information supplied from the cycle information generation unit 56 to the sensor data supplied from the sensor I/O 45. In addition, the cycle information addition unit 57 supplies the sensor data to which the cycle information is added (hereinafter, also referred to as cycle information added sensor data) to the RAM 43 via the bus so as to be stored therein.

Here, the cycle information added sensor data stored in the RAM 43 is transmitted from the communication I/O 46 to the main CPU 20 via the bus.

In the sub CPU 40 configured as described above, the timing control unit 51 generates the clock signals of the reference cycle T, and supplies the clock signals to the counter control unit 52.

The counter control unit 52 starts counting of the clock signals from the timing control unit 51 using the counter included therein not illustrated in the drawing.

Then, when there is a request for providing sensor data (provision request) from the main CPU 20 via the bus, the counter control unit 52 generates timing signals indicating timings of sampling cycles of the sensor data for which the provision request is made from the main CPU 20 based on the counted value of the counter, and supplies the signals to the sensor I/O control unit 53.

Furthermore, the counter control unit 52 supplies the indices of the sampling cycles corresponding to the timings indicated by the timing signals to the cycle information generation unit 56.

The sensor I/O control unit 53 controls the sensor I/O 45 according to the timing signals supplied from the counter control unit 52 so as to acquire the sensor data from the sensor $11_n$.

The sensor data acquired by the sensor I/O 45 is supplied from the sensor I/O 45 to the cycle information addition unit 57.

On the other hand, the cycle information generation unit 56 generates cycle information from the indices of the sampling cycles from the counter control unit 52, and supplies the information to the cycle information addition unit 57.

The cycle information addition unit 57 adds the cycle information from the cycle information generation unit 56 to the sensor data from the sensor I/O 45, and transfers the cycle information added sensor data obtained as a result to the RAM 43 via the bus so as to be stored therein.

When the transfer of the cycle information added sensor data to the RAM 43 is completed, the cycle information addition unit 57 transmits a transfer completion notification indicating the completion to the CPU core 42.

When the transfer completion notification is received from the cycle information addition unit 57, the CPU core 42 controls the communication I/O 46 to transmit the cycle information added sensor data stored in the RAM 43 to the main CPU 20.

Here, in the present specification, the processes performed by a computer (processor) (CPU) according to a program do not have to be performed in a time series manner in the order described in the flowcharts. In other words, the processes performed by the computer according to the program include processes executed in parallel or individually (for example, parallel processes or processes according to objects).

In addition, the program may be processed by one computer, or by a plurality of computers in a distributed manner. Furthermore, the program may be transferred to a remote computer so as to be executed.

It should be noted that an embodiment of the present technology is not limited to the embodiment described above, and can be variously modified within a scope not departing from the gist of the present technology.

For example, in the present embodiment, that the correspondence relationship between a sampling cycle and an index of the sampling cycle is fixed (without change), and the fixed correspondence relationship is recognized by the main CPU 20 is an implicit premise, but the correspondence relationship between a sampling cycle and an index thereof can be changed.

In other words, for example, when the sub CPU 40 employs 1000 sampling cycles of 1T, 2T, . . . , 1000T (when sensor data having 1000 sampling cycles can be provided), and when the main CPU 20 has requested provision of the 2T data hitherto, and the provision of the 2T data is cancelled, and then provision of 1000T data is requested, the sub CPU 40 changes the correspondence relationship between the sampling cycles and the indices, and a value V that has been used as the index of the 2T data hitherto can be used as the index of the 1000T data.

When the correspondence relationship between a sampling cycle and an index is set to be changed, and when the correspondence relationship is changed, a process of the sub CPU 40 notifying the main CPU 20 of the changed correspondence relationship is necessary. However, with regard to the index, the number of bits of a value used as the index can be reduced.

In other words, when a 1-bit-on-bit string can be employed as an index of a sampling cycle, for example, if the correspondence relationship between the sampling cycle and the index is fixed, and when the sub CPU 40 can employ 1000 sampling cycles of 1T to 1000T, the 1-bit-on-bit string as an index has an enormous number of bits that is 1000.

By setting the correspondence relationship between a sampling cycle and an index to be changeable, indices having the same value can be associated with different sampling cycles at different times, and accordingly, the 1-bit-on-bit string as an index can be prevented from having an enormous number of bits.

In other words, when the sub CPU 40 can employ 1000 sampling cycles of 1T to 1000T, but there are P (<1000) sampling cycles of sampled data that can be simultaneously provided, for example, the number of bits of a 1-bit-on-bit string as an index can be set to P by setting the correspondence relationship between the sampling cycles and indices thereof to be changeable.

In addition, in the present embodiment, the present technology is described exemplifying the case in which the sub CPU 40 as a sensor data acquiring block that acquires and provides sensor data from the sensor $11_n$ and the main CPU 20 as a sensor data receiving block that receives the provision of the sensor data are present in one housing of the mobile terminal, however in addition to that, the present technology can also be applied to a case in which, for example, the sensor data acquiring block and the sensor data receiving block are present in different devices, and the device in which the sensor data acquiring block is present provides sensor data to the device in which the sensor data receiving block is present via a network.

Furthermore, the present technology can also be applied to cases in which the main CPU 20 and the sub CPU 40 are configured in separate integrated circuit (IC) chips and configured in an IC chip of a multi-CPU configuration in which a plurality of CPUs are included in one IC chip. When the main CPU 20 and the sub CPU 40 are configured in one IC chip of the multi-CPU configuration, a communication path between the main CPU 20 and the sub CPU 40 in the IC chip can be provided in the form of a memory shared by the main CPU 20 and the sub CPU 40 (shared memory).

In addition, in the present embodiment, as the sensor data acquiring block that acquires and provides sensor data from the sensor $11_n$, the sub CPU 40 that is a CPU that can execute various processes using software is employed, however in addition to that, as the sensor data acquiring block, for example, an IC that is specified and made as hardware for the purpose of acquiring and providing sensor data from the sensor $11_n$ can be employed.

Furthermore, in the present embodiment, sensor data is set to be acquired from one sensor $11_n$ among the sensors $11_1$ to $11_N$ (of FIG. 3) in order to simplify description, but the present technology can also be applied to a case in which sensor data is simultaneously acquired from a plurality of sensors. When the management table (of FIG. 11) is used in simultaneously acquiring and providing sensor data from a plurality of sensors, the management table is prepared for each sensor, and the acquisition and provision of the sensor data from the sensors are performed using the management table of the sensors.

It should be noted that the present technology can adopt the following configurations.

(1) A data processing apparatus including:
a first processor configured to acquire sensor data from at least one sensor,
wherein the first processor provides the acquired sensor data and a cycle information to a second processor, and
wherein the cycle information includes information indicating a sampling cycle corresponding to a timing at which the sensor data is acquired.

(2) The data processing apparatus according to (1), wherein the second processor executes an application program, which requests the acquired sensor data from the first processor, and the first processor sends the acquired sensor data to the second processor in response to the request.

(3) The data processing apparatus according to (1) or (2), wherein the sampling cycle of the acquired sensor data is selected from a plurality of frequency cycles that are frequency cycles of powers of two 2k of a reference frequency cycle T.

(4) The data processing apparatus according to any one of (1) to (3), wherein the cycle information further includes information indicating a maximum sampling cycle of the plurality of frequency cycles.

(5) The data processing apparatus according to any one of (1) to (4), wherein the sampling cycle of the acquired sensor data is selected from a plurality of sampling cycles which are predetermined multiples of a reference cycle.

(6) The data processing apparatus according to any one of (1) to (5), wherein the cycle information includes a 1-bit-on-bit string, each of the bits corresponding to one of the sampling frequency cycles.

(7) The data processing apparatus according to any one of (1) to (6), wherein the first processor provides the acquired sensor data to the second processor at the timing corresponding to the sampling cycle at which the sensor data is sampled.

(8) The data processing apparatus according to any one of (1) to (7), wherein the sampling cycle is selected from a plurality of frequency cycles that are frequency cycles of powers of two 2k of a reference frequency cycle T.

(9) The data processing apparatus according to any one of (1) to (8), wherein the first processor controls the timing at which the sensor data is acquired.

(10) The data processing apparatus according to any one of (1) to (9), wherein when the second processor executes an application that requests for sensor data at a current timing corresponding to the sampling cycle at which the sensor data is sampled, the first processor acquires the sensor data and provides the acquired sensor data to the second processor at the timing corresponding to the sampling cycle at which the sensor data is sampled.

(11) The data processing apparatus according to any one of (1) to (10), wherein the cycle information is provided in a form of a management table which stores the cycle information correlated with sampling cycles of sensor data sampled by the first processor.

(12) The data processing apparatus according to any one of (1) to (11), wherein when the second processor requests the acquired sensor data from the first processor, the first processor updates the cycle information provided in the management table in accordance with the request by the second processor.

(13) The data processing apparatus according to any one of (1) to (12), wherein when the second processor requests the acquired sensor data from the first processor at a specific timing, the first processor provides the acquired sensor data and the cycle information to a second processor, the cycle information reflecting the specific timing requests by the second processor.

(14) The data processing apparatus according to any one of (1) to (13), wherein the first processor exclusively acquires the sensor data and the second processor obtains the acquired sensor data through the first processor.

(15) The data processing apparatus according to any one of (1) to (14), wherein the first processor is provided on a Global Navigation Satellite Systems (GNSS) semiconductor chip.

(16) The data processing apparatus according to any one of (1) to (15), wherein the first processor has a substantially smaller power consumption than the second processor.

(17) The data processing apparatus according to any one of (1) to (16), further including a display screen configured to display an interface of a program executed by the second processor, the program being configured to request the acquired sensor data from the first processor when the program is executed by the second processor.

(18) The data processing apparatus according to any one of (1) to (17), further including an Input/Output (I/O) unit coupled to at least one of the at least one sensor, wherein the I/O unit is configured to enable the transmission of the acquired sensor data from the first processor to the second processor.

(19) A data processing apparatus including:
a second processor configured to execute an application program,
wherein the executed application program requests a sensor data acquired by a first processor that is coupled to the second processor, and the second processor receives the requested sensor data and a cycle information from the first processor in response to the request,
wherein the cycle information includes information indicating a sampling cycle corresponding to a timing at which the sensor data is acquired.

(20) The data processing apparatus according to (19), wherein the second processor is further configured to provide the requested sensor data to the application program at a timing based on the cycle information.

(21) A data processing method including:
executing an application program by a second processor,
wherein the executed application program requests a sensor data acquired by a first processor that is coupled to the second processor, and the second processor receives the requested sensor data and a cycle information from the first processor in response to the request, and
wherein the cycle information includes information indicating a sampling cycle corresponding to a timing at which the sensor data is acquired.

(22) A non-transitory computer-readable medium having embodied thereon a program, which when executed by a computer causes the computer to execute a method, the method including:
executing an application program by a second processor,
wherein the executed application program requests a sensor data acquired by a first processor that is coupled to the second processor, and the second processor receives the requested sensor data and a cycle information from the first processor in response to the request, and
wherein the cycle information includes information indicating a sampling cycle corresponding to a timing at which the sensor data is acquired.

(23) A data processing method including:
acquiring, by a first processor, sensor data from at least one sensor, wherein the acquired sensor data and a cycle information are provided to a second processor by the first processor, and wherein the cycle information includes information indicating a sampling cycle corresponding to a timing at which the sensor data is acquired.

(24) The data processing method according to (23), wherein the acquired sensor data is provided to an application program executed by the second processor, at a timing based on the cycle information.

(25) A non-transitory computer-readable medium having embodied thereon a program, which when executed by a computer causes the computer to execute a method, the method including:
acquiring, by a first processor, sensor data from at least one sensor,
wherein the acquired sensor data and a cycle information are provided to a second processor by the first processor, and
wherein the cycle information includes information indicating a sampling cycle corresponding to a timing at which the sensor data is acquired.

(26) The computer-readable medium according to (25), wherein the acquired sensor data is provided to an application program executed by the second processor, at a timing based on the cycle information.

It should be noted that the present technology can adopt the following configurations.

1. A data processing device that includes an acquisition control unit that performs acquisition control to acquire sensor data at timings of each of one or more sampling cycles from a sensor that senses a physical quantity and outputs the sensor data indicating the physical quantity, and an output unit that outputs the sensor data with cycle information indicating the sampling cycles corresponding to the timings at which the sensor data is acquired.

2. The data processing device described in 1, in which the acquisition control unit performs acquisition control to acquire the sensor data at timings of one or more of the sampling cycles which are predetermined multiples of a predetermined reference cycle.

3. The data processing device described in 2, in which the acquisition control unit performs the acquisition control to acquire the sensor data at the timings of the sampling cycles which are powers of a predetermined integer of the predetermined reference cycle.

4. The data processing device described in 3, in which the acquisition control unit performs the acquisition control to acquire the sensor data at the timings of the sampling cycles which are powers of 2 of the predetermined reference cycle.

5. The data processing device described in 4 further including a generation unit that generates, as the cycle information to be output with the sensor data, information indicating a maximum sampling cycle among one or more of the sampling cycles corresponding to timings at which the sensor data is acquired.

6. The data processing device described in any one of 2 to 4, in which information indicating the sampling cycles is bit strings in each of which only one bit is set, the device including a generation unit that generates, as the cycle information to be output with the sensor data, the logical sum of the bit strings respectively indicating one or more of the sampling cycles corresponding to a timing at which the sensor data is acquired.

7. The data processing device described in any one of 1 to 6, in which the acquisition control unit performs the acquisition control to acquire the sensor data at timings of the sampling cycles which are requested by an application that uses the sensor data.

8. The data processing device described in any one of 1 to 7, in which the sensor data and the cycle information are provided to a processor that executes an application that requests the sensor data.

9. A data processing method that includes steps of acquiring sensor data at timings of each of one or more sampling cycles from a sensor that senses a physical quantity and outputs the sensor data indicating the physical quantity, and outputting the sensor data with cycle information indicating the sampling cycles corresponding to the timings at which the sensor data is acquired.

10. A program that instructs a computer to function as an acquisition control unit that performs acquisition control to acquire sensor data at timings of each of one or more sampling cycles from a sensor that senses a physical quantity and outputs the sensor data indicating the physical quantity, and an output unit that outputs the sensor data with cycle information indicating the sampling cycles corresponding to the timings at which the sensor data is acquired.

The present disclosure contains subject matter related to that disclosed in Japanese Priority Patent Application JP 2012-260627 filed in the Japan Patent Office on Nov. 29, 2012, the entire contents of which are hereby incorporated by reference.

REFERENCE SIGNS LIST

10 Sensor unit
$11_1$ to $11_N$ Sensor
20 Main CPU
30, 40 Sub CPU
41 Timer
42 CPU core
43 RAM
44 ROM
45 Sensor I/O
46 Communication I/O
50 Sensor data acquisition control unit
51 Timing generation unit
52 Counter control unit
53 Sensor I/O control unit
56 Cycle information generation unit
57 Cycle information addition unit

The invention claimed is:
1. A data processing apparatus comprising:
a first processor configured to
receive a request from an application program executed by a second processor, the request being to acquire sensor data at a plurality of sampling cycles which are predetermined multiples of a predetermined reference cycle;
acquire, at timings corresponding to the plurality of sampling cycles, the sensor data from at least one sensor in response to receiving the request;
employ, as information indicating the plurality of sampling cycles, series of indices;
generate cycle information comprising information indicating the plurality of sampling cycles corresponding to the timings at which the sensor data is acquired by compressing the series of indices; and
provide the acquired sensor data and the generated cycle information to the second processor at a specific timing requested by the second processor,
wherein
the series of indices is comprised entirely of indices which are integer powers of two, the cycle information comprising a 1-bit-on-bit string, each of the bits corresponding to a different one of the sampling cycles, and the 1-bit-on-bit string represents a Boolean sum logic value bit string of one or more timing requests.

2. The data processing apparatus of claim 1, wherein the cycle information further comprises information indicating a maximum sampling cycle of the plurality of cycles.

3. The data processing apparatus of claim 1, wherein the first processor provides the acquired sensor data to the second processor at the timing corresponding to the sampling cycle at which the sensor data is sampled.

4. The data processing apparatus of claim 3, wherein the first processor controls the timing at which the sensor data is acquired.

5. The data processing apparatus of claim 3, wherein when the second processor executes an application that requests for sensor data at a current timing corresponding to the sampling cycle at which the sensor data is sampled, the first processor acquires the sensor data and provides the acquired sensor data to the second processor at the timing corresponding to the sampling cycle at which the sensor data is sampled.

6. The data processing apparatus of claim 1, wherein the cycle information is provided in a form of a management table which stores the cycle information correlated with sampling cycles of sensor data sampled by the first processor.

7. The data processing apparatus of claim 6, wherein when the second processor requests the acquired sensor data from the first processor, the first processor updates the cycle information provided in the management table in accordance with the request by the second processor.

8. The data processing apparatus of claim 1, wherein the first processor exclusively acquires the sensor data and the second processor obtains the acquired sensor data through the first processor.

9. The data processing apparatus of claim 1, wherein the first processor is provided on a Global Navigation Satellite Systems (GNSS) semiconductor chip.

10. The data processing apparatus of claim 1, wherein the first processor has a substantially smaller power consumption than the second processor.

11. The data processing apparatus of claim 1, further comprising:
a display screen configured to display an interface of a program executed by the second processor, the program being configured to request the acquired sensor data from the first processor when the program is executed by the second processor.

12. The data processing apparatus of claim 1, further comprising:
an Input/Output (I/O) unit coupled to at least one of the at least one sensor, wherein the I/O unit is configured to enable the transmission of the acquired sensor data from the first processor to the second processor.

13. A data processing apparatus comprising:
a second processor configured to execute an application program,
wherein the executed application program sends a request being to acquire sensor data at a plurality of sampling cycles which are predetermined multiples of a predetermined reference cycle, and the second processor receives the requested sensor data and cycle information from a first processor that is coupled to the second processor in response to the request, wherein the cycle information comprises information indicating a plurality of sampling cycles corresponding to timings at which the sensor data is acquired, the first processor employing, as information indicating the plurality of sampling cycles, series of indices, and the cycle information being generated by compressing the series of indices by the first processor, the cycle information comprising a 1-bit-on-bit string, each of the bits corresponding to a different one of the sampling cycles and the 1-bit-on-bit string represents a Boolean sum logic value bit string of one or more timing requests, and wherein the series of indices is comprised entirely of indices which are integer powers of two.

14. The data processing apparatus of claim 13, wherein the second processor is further configured to provide the requested sensor data to the application program at a timing based on the cycle information.

15. A data processing method comprising:
executing an application program by a second processor,
wherein the executed application program sends a request being to acquire sensor data at a plurality of sampling cycles which are predetermined multiples of a predetermined reference cycle, and the second processor receives the requested sensor data and cycle information from a first processor that is coupled to the second processor in response to the request, wherein the cycle information comprises information indicating a plurality of sampling cycles corresponding to timings at which the sensor data is acquired, the first processor employing, as information indicating the plurality of sampling cycles, series of indices, and the cycle information being generated by compressing the series of indices by the first processor, the cycle information comprising a 1-bit-on-bit string, each of the bits corresponding to a different one of the sampling cycles and the 1-bit-on-bit string represents a Boolean sum logic value bit string of one or more timing requests, and wherein the series of indices is comprised entirely of indices which are integer powers of two.

16. A non-transitory computer-readable medium having embodied thereon a program, which when executed by a computer causes the computer to execute a method, the method comprising:
executing an application program by a second processor,
wherein the executed application program sends a request being to acquire sensor data at a plurality of sampling cycles which are predetermined multiples of a predetermined reference cycle, and the second processor receives the requested sensor data and cycle information from a first processor that is coupled to the second processor in response to the request, wherein the cycle information comprises information indicating a plurality of sampling cycles corresponding to timings at which the sensor data is acquired, the first processor employing, as information indicating the plurality of sampling cycles, series of indices, and the cycle information being generated by compressing the series of indices by the first processor, the cycle information comprising a 1-bit-on-bit string, each of the bits corresponding to a different one of the sampling cycles and the 1-bit-on-bit string represents a Boolean sum logic value bit string of one or more timing requests, and wherein the series of indices is comprised entirely of indices which are integer powers of two.

17. A data processing method comprising:
- receiving a request from an application program executed by a second processor, the request being to acquire sensor data at a plurality of sampling cycles which are predetermined multiples of a predetermined reference cycle;
- acquiring, at timings corresponding to the plurality of sampling cycles, by a first processor, sensor data from at least one sensor in response to receiving the request;
- employing, as information indicating the plurality of sampling cycles, series of indices;
- generating cycle information comprising information indicating the plurality of sampling cycles corresponding to the timings at which the sensor data is acquired by compressing the series of indices, the cycle information comprising a 1-bit-on-bit string, each of the bits corresponding to a different one of the sampling cycles and the 1-bit-on-bit string represents a Boolean sum logic value bit string of one or more timing requests; and
- providing the acquired sensor data and the generated cycle information to the second processor by the first processor, wherein
- the series of indices is comprised entirely of indices which are integer powers of two.

18. The data processing method of claim 17, wherein the acquired sensor data is provided to the application program executed by the second processor, at a timing based on the cycle information.

19. A non-transitory computer-readable medium having embodied thereon a program, which when executed by a computer causes the computer to execute a method, the method comprising:
- receiving a request from an application program executed by a second processor, the request being to acquire sensor data at a plurality of sampling cycles which are predetermined multiples of a predetermined reference cycle;
- acquiring, at timings corresponding to the plurality of sampling cycles, by a first processor, sensor data from at least one sensor in response to receiving the request;
- employing, as information indicating the plurality of sampling cycles, series of indices;
- generating cycle information comprising information indicating the plurality of sampling cycles corresponding to the timings at which the sensor data is acquired by compressing the series of indices, the cycle information comprising a 1-bit-on-bit string, each of the bits corresponding to a different one of the sampling cycles and the 1-bit-on-bit string represents a Boolean sum logic value bit string of one or more timing requests; and
- providing the acquired sensor data and the generated cycle information to the second processor by the first processor, wherein
- the series of indices is comprised entirely of indices which are integer powers of two.

20. The computer-readable medium of claim 19, wherein the acquired sensor data is provided to the application program executed by the second processor, at a timing based on the cycle information.

21. The data processing apparatus of claim 1, wherein the first processor is further configured to:
- receive another request from another application program executed by the second processor, the another request being to acquire sensor data at another sampling cycle;
- acquire, at another timing corresponding to the another sampling cycle, another sensor data from at least one sensor in response to receiving the another request;
- generate another cycle information comprising information indicating a sampling cycle corresponding to a timing at which the sensor data and the another data are acquired; and
- provide the another acquired sensor data and the generated another cycle information to the second processor,
- wherein the first processor acquires the sensor data only at the timing corresponding to the sampling cycle and the another sampling cycle.

22. The data processing apparatus of claim 1, wherein the first processor acquires the sensor data only at the timings corresponding to the plurality of sampling cycles indicated in the request.

* * * * *